(12) United States Patent
Zeng et al.

(10) Patent No.: US 9,367,268 B2
(45) Date of Patent: Jun. 14, 2016

(54) PRINT PRODUCTION SCHEDULING

(75) Inventors: Jun Zeng, Sunnyvale, CA (US); Qing Duan, Durham, NC (US); Krishnendu Chakrabarty, Chapel Hill, NC (US); I-Jong Lin, Half Moon Bay, CA (US); Gary J Dispoto, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/364,752

(22) PCT Filed: Apr. 30, 2012

(86) PCT No.: PCT/US2012/035734
§ 371 (c)(1),
(2), (4) Date: Jun. 12, 2014

(87) PCT Pub. No.: WO2013/165338
PCT Pub. Date: Nov. 7, 2013

(65) Prior Publication Data
US 2015/0098110 A1    Apr. 9, 2015

(51) Int. Cl.
*G06F 3/12*    (2006.01)
*G06Q 10/06*   (2012.01)

(52) U.S. Cl.
CPC .............. *G06F 3/1211* (2013.01); *G06F 3/126* (2013.01); *G06F 3/1263* (2013.01); *G06F 3/1285* (2013.01); *G06Q 10/06313* (2013.01); *G06Q 10/06316* (2013.01); *G06F 3/1217* (2013.01)

(58) Field of Classification Search
CPC .................. G06Q 10/06313; G06Q 10/06316
See application file for complete search history.

(56) References Cited

U.S. PATENT DOCUMENTS

| | | | |
|---|---|---|---|
| 6,578,068 B1 | 6/2003 | Bowman-Amuah | |
| 6,999,185 B1* | 2/2006 | Salgado ............. | H04N 1/00915 358/1.12 |
| 7,508,535 B2 | 3/2009 | Hart et al. | |
| 7,646,505 B2* | 1/2010 | Tian ....................... | G06F 3/1212 358/1.15 |
| 8,145,517 B2* | 3/2012 | Rai ..................... | G06Q 10/0631 705/7.12 |
| 8,154,751 B2 | 4/2012 | Aoki | |
| 8,599,405 B2* | 12/2013 | Mandel ........................ 358/1.15 | |
| 2006/0268317 A1* | 11/2006 | Lofthus .............. | H04N 1/00954 358/1.15 |
| 2009/0138878 A1* | 5/2009 | Fernstrom ............. | G06F 1/3203 718/102 |
| 2010/0091318 A1* | 4/2010 | Ferlitsch ............... | G06F 3/1204 358/1.15 |
| 2010/0195155 A1* | 8/2010 | Gustafson .............. | G06Q 10/06 358/1.15 |
| 2010/0287553 A1* | 11/2010 | Schmidt .................. | G06F 9/485 718/101 |
| 2011/0007347 A1* | 1/2011 | Kamath ................ | G06F 3/1203 358/1.15 |
| 2011/0211218 A1 | 9/2011 | Gilmore et al. | |
| 2011/0320452 A1* | 12/2011 | Kawai ............... | G06F 17/30882 707/737 |
| 2012/0057191 A1 | 3/2012 | Gnanasambandam et al. | |
| 2012/0086978 A1 | 4/2012 | Uchikawa | |
| 2012/0123980 A1* | 5/2012 | Bhandari ................. | G06N 3/12 706/13 |
| 2012/0154846 A1* | 6/2012 | Hoarau ............... | G06F 11/3072 358/1.14 |
| 2014/0032255 A1* | 1/2014 | Hegazi ................... | G06Q 10/04 705/7.22 |
| 2014/0118561 A1* | 5/2014 | La Lumondiere ... | H04N 5/2354 348/207.1 |

* cited by examiner

*Primary Examiner* — Benjamin O Dulaney
(74) *Attorney, Agent, or Firm* — Dicke, Billig & Czaja, PLLC (PAT)

(57) ABSTRACT

A print production system includes a dispatcher and a task-resource scheduler. The dispatcher sorts print requests for placement among a series of containers to identify relative priorities among all print requests in each container and then merges the containers together to produce a prioritized list of print requests among all containers. Upon release by the dispatcher of a top N print requests from the prioritized list, the scheduler converts the prioritized list into a task-resource schedule for print production.

15 Claims, 10 Drawing Sheets

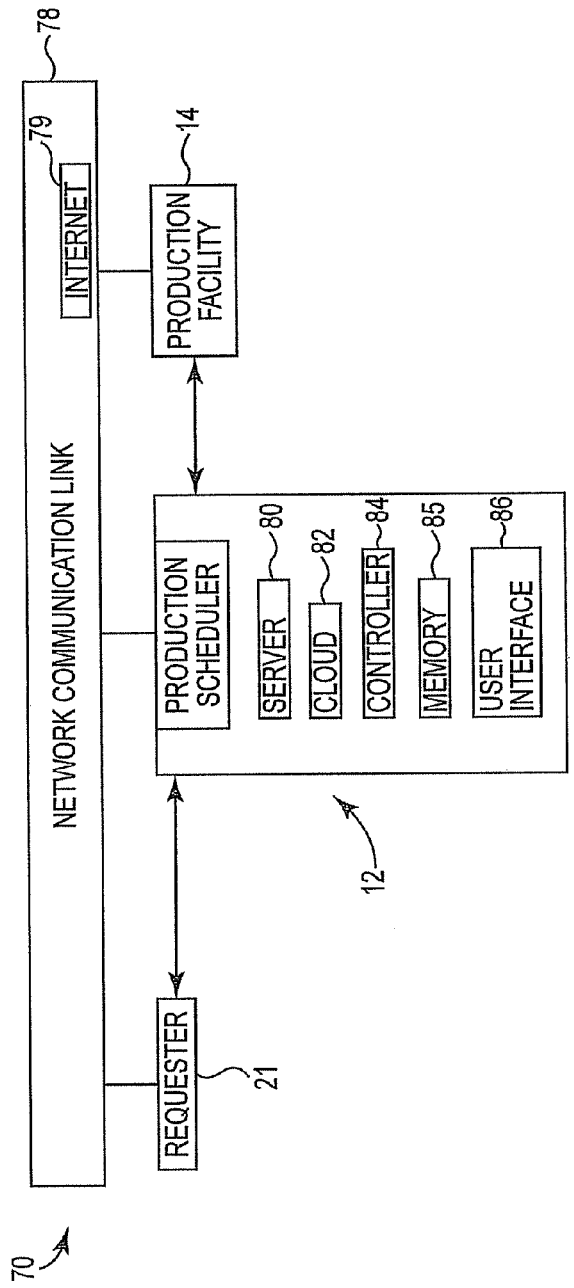
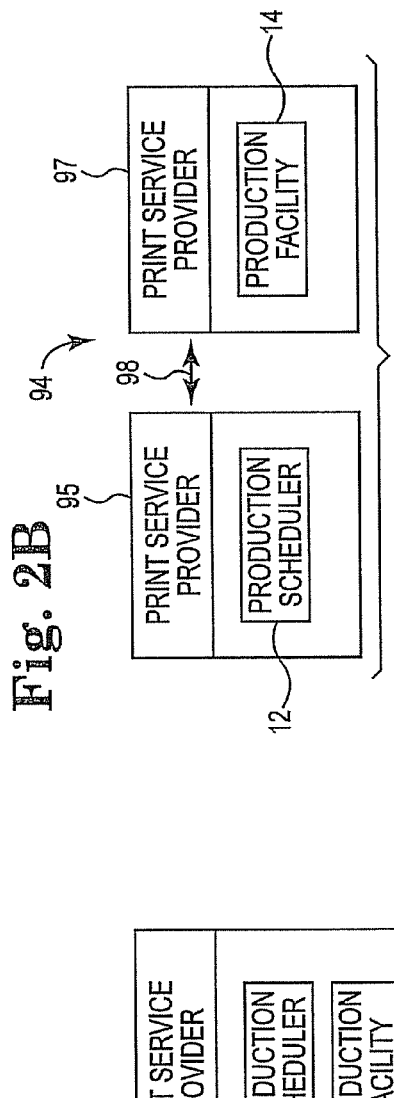
Fig. 2B
Fig. 2C
Fig. 2D

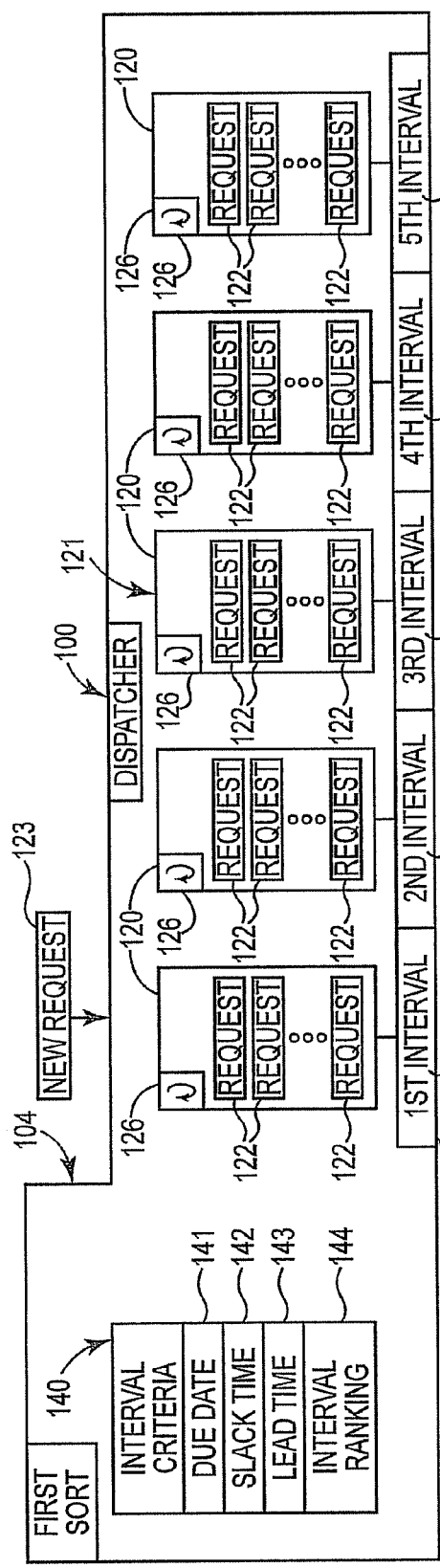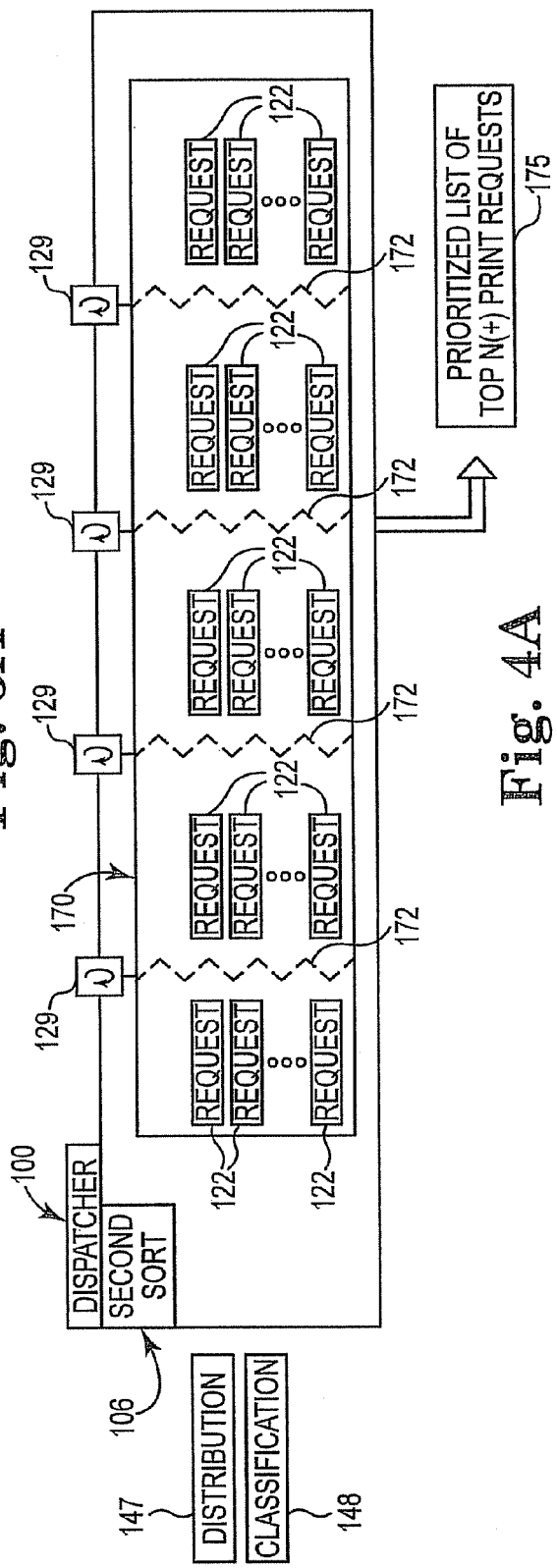

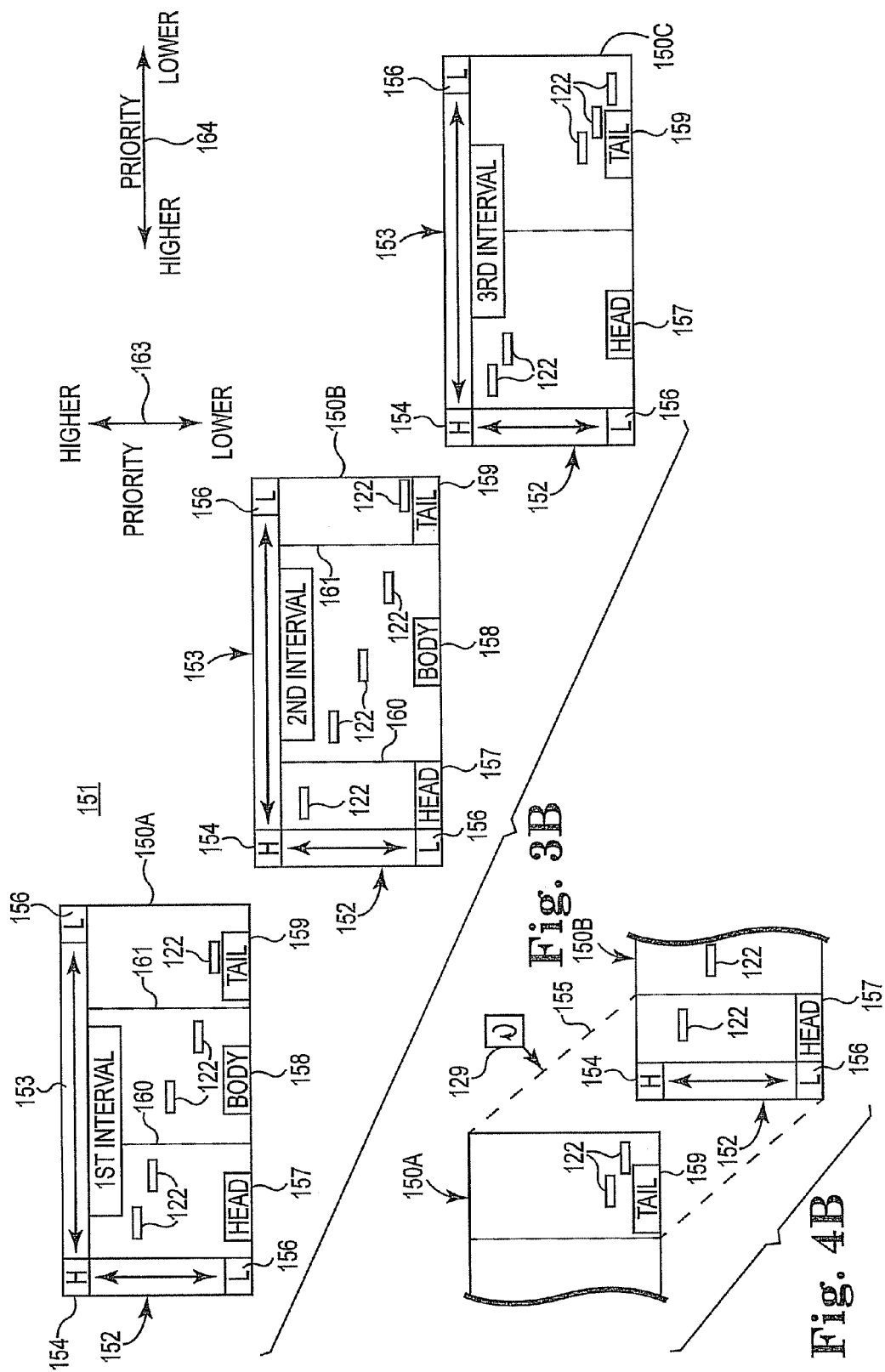

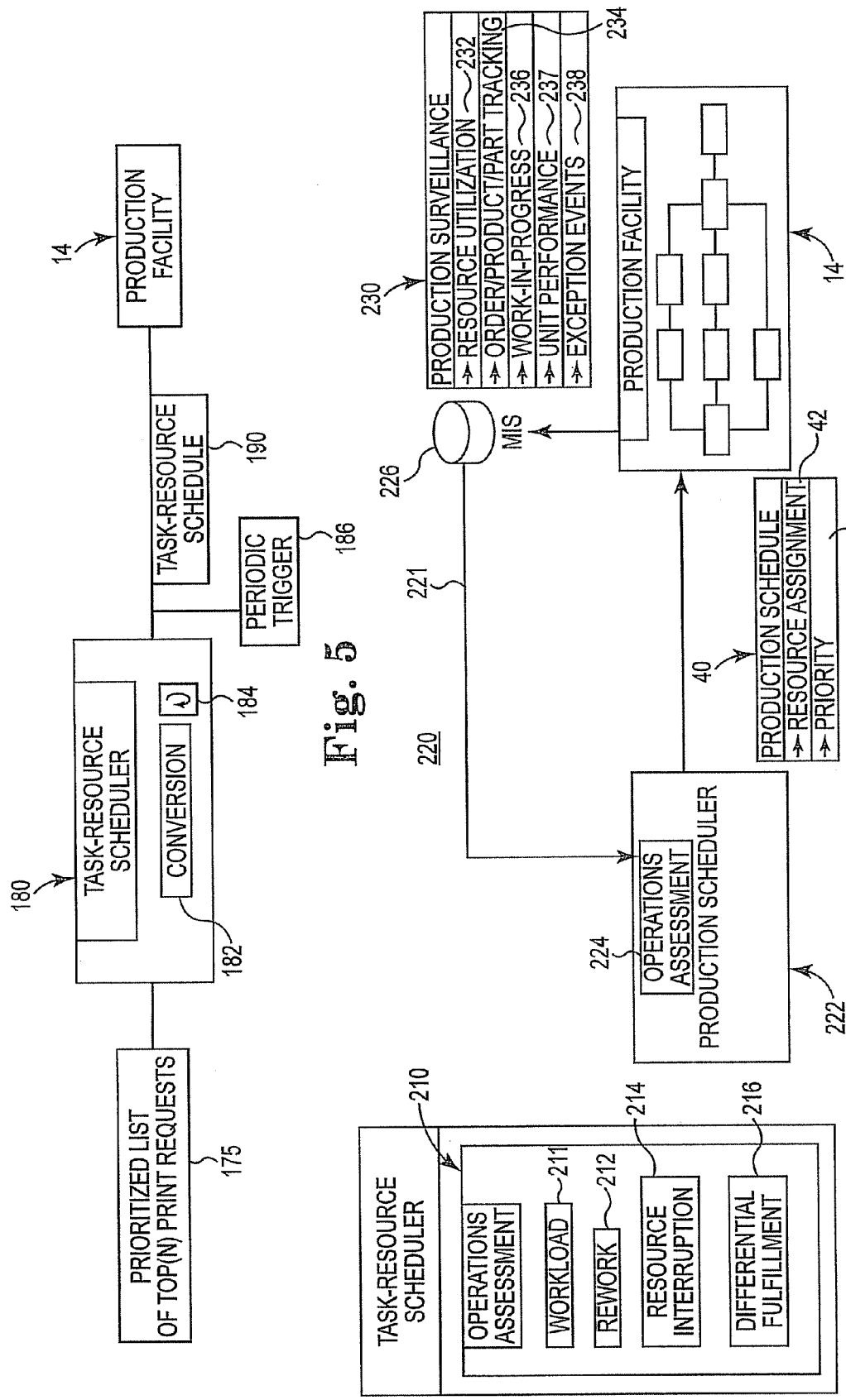

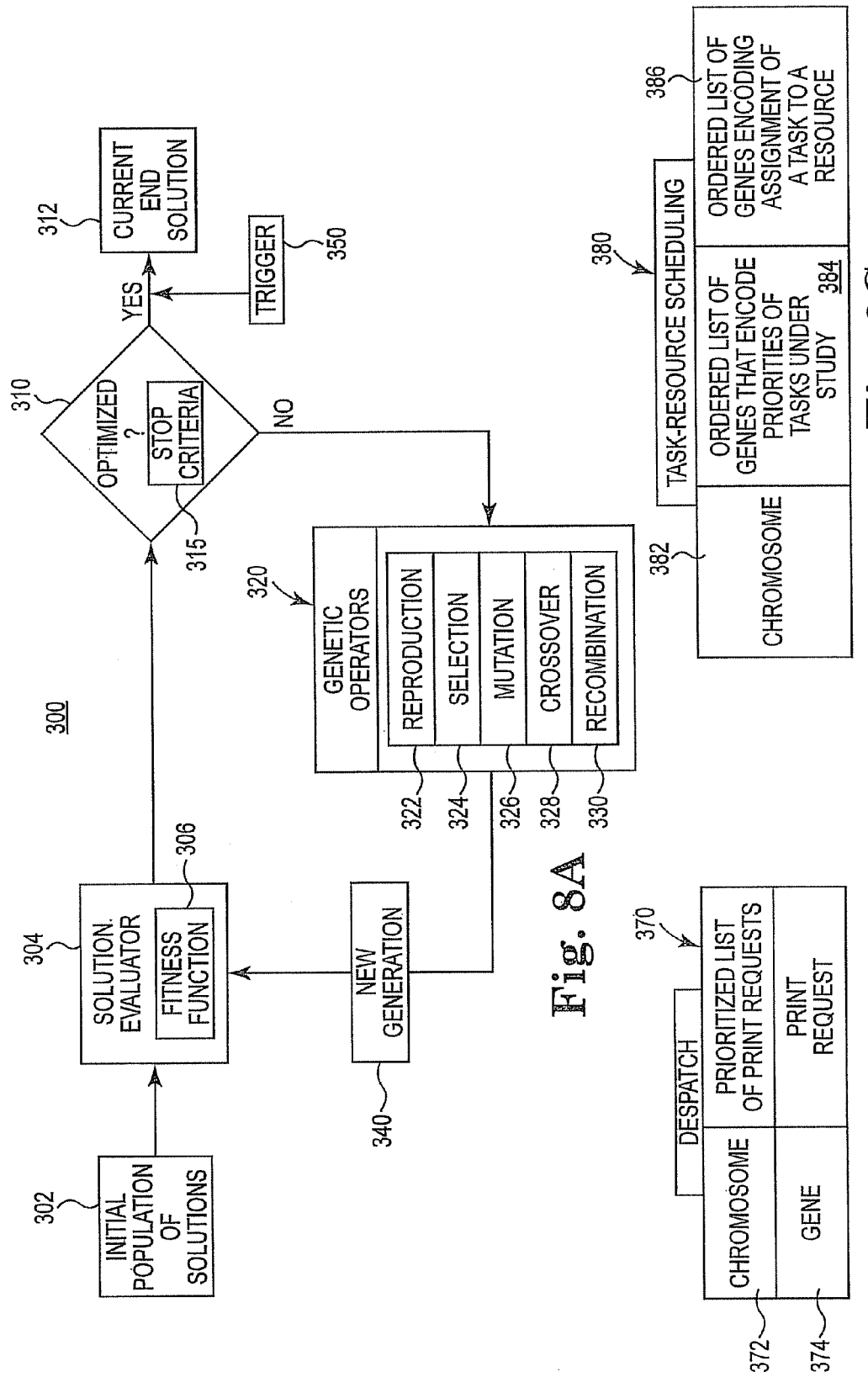

PRINT PRODUCTION SCHEDULING

BACKGROUND

Commercial print shops handle a large volume of print jobs and traditionally use human management to produce a daily production schedule. Some commercial print shops have tried automating production scheduling. Despite valiant efforts in these traditional approaches, optimal efficiency and effectiveness has continued to elude commercial print shops.

BRIEF DESCRIPTION OF THE DRAWINGS

FIG. 2B is a block diagram schematically illustrating one example of a print production system in the present disclosure.

FIG. 2C is a block diagram schematically illustrating one example of a print service provider in the present disclosure.

FIG. 2D is a block diagram schematically illustrating one example of a group of print service providers in the present disclosure.

FIG. 3A is a block diagram schematically illustrating one example of a first sort function of a dispatcher of a print production scheduler in the present disclosure.

FIG. 3B is a diagram schematically illustrating print requests at least partially sorted via first a first sort function of a dispatcher module, according to one example of the present disclosure.

FIG. 4A is a block diagram schematically illustrating one example of a second sort function of a dispatcher of a print production scheduler in the present disclosure.

FIG. 4B is a diagram schematically illustrating a merging operation via a second sort function of a dispatcher module of a print production scheduler, according to one example of the present disclosure.

FIG. 5 is a block diagram schematically illustrating one example of a portion of a print production system, including a task-resource scheduler, in the present disclosure.

FIG. 6A is a block diagram schematically illustrating one example of a task-resource scheduler of a print production scheduler in the present disclosure.

FIG. 6B is a block diagram schematically illustrating one example of a portion of a print production system in the present disclosure.

FIG. 8A is a flow diagram schematically illustrating one example of an evolutionary-based optimization scheme in association with one example of a print production system of the present disclosure.

FIG. 8B is a table schematically illustrating one example of a chromosome representation of an example evolutionary-based optimization scheme of the present disclosure.

FIG. 8C is a table schematically illustrating another example of a chromosome representation in an example evolutionary-based optimization scheme of the present disclosure.

DETAILED DESCRIPTION

Figure 1:
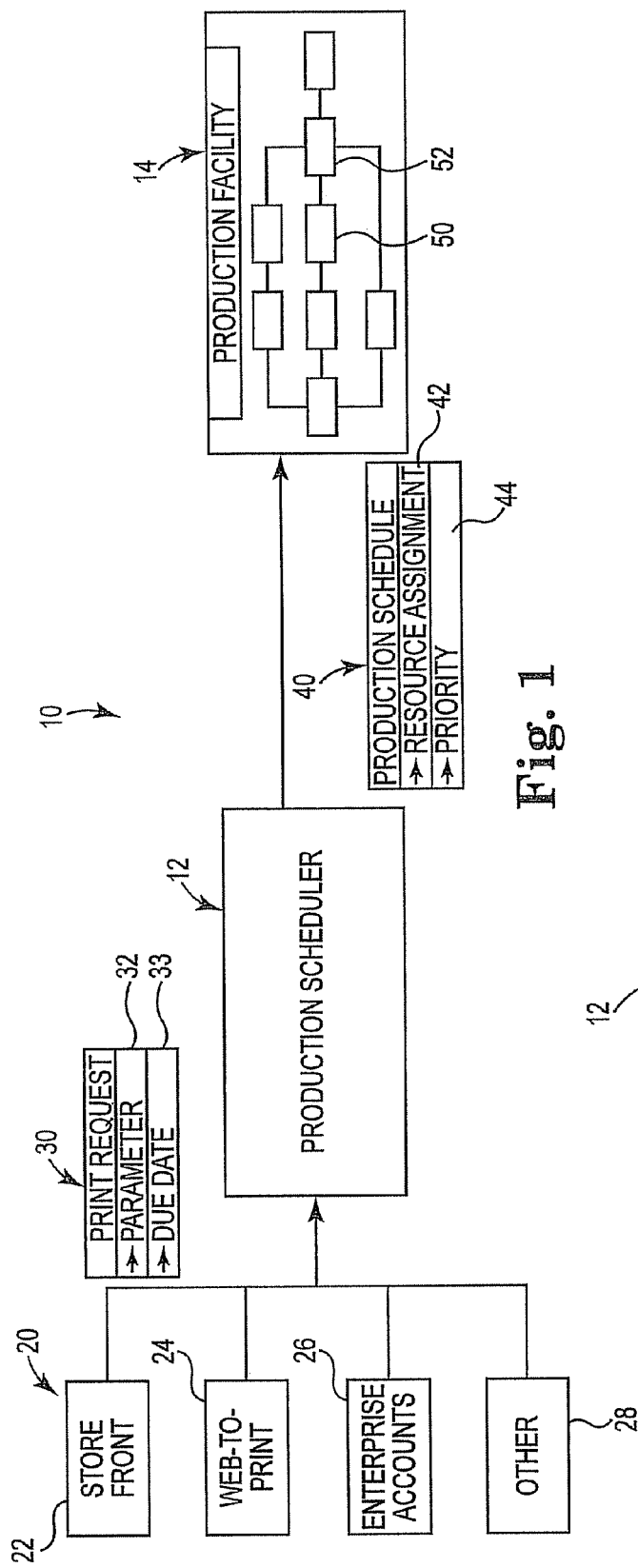
FIG. 1 is a block diagram schematically illustrating one example of a print production system in the present disclosure.

In the following detailed description, reference is made to the accompanying drawings which form a part hereof, and in which is shown by way of illustration specific examples and embodiments of the present disclosure, which may be practiced. In this regard, directional terminology, such as "top," "bottom," "front," "back," "leading," "trailing," etc., is used with reference to the orientation of the Figure(s) being described. Because components in the examples can be positioned in a number of different orientations, the directional terminology is used for purposes of illustration and is in no way limiting. It is to be understood that other examples and embodiments may be utilized and structural or logical changes may be made without departing from the scope of the present disclosure.

Examples of the present disclosure provide techniques for production scheduling of print requests. In general terms, examples of a production scheduler in the present disclosure take print requests and determine an effective and efficient manner of scheduling those print requests for production at a print production factory or facility. In one example, the production scheduler operates in an environment in which a production facility is operating to meet high demand and in which scheduling print requests is challenging due to the wide variety of types of print requests, the different sizes of print requests, the short response times set by the customer, and high fault rate in the physical production process, among other factors. This environment has further experienced a high growth in the quantity of print requests, a decrease in the average size of each print request, and shorter turnaround times. Finally, print service providers are receiving more print requests having a high degree of customization, even when the scope of the print request is quite small. Despite this challenging environment, the examples in the present disclosure provide high-speed, automated production scheduling that efficiently maximizes the factory's business objectives, for instance, maximizing a throughput of the production facility while meeting all the specialized demands common in the environment of today's printing industry. Traditional human management or traditional automated, rule-based production is overwhelmed by, and simply cannot cope with, the challenging demands of the above-described environment.

In one example of a print production scheduler of the present disclosure, print requests are placed into different containers according to an attribute, such as their respective due date and/or other attributes described below. In one aspect, each container has a pre-assigned interval. When the pertinent attribute is a due date, a print request is assigned to a container when its associated attribute (e.g. a due date) falls into this due date interval. The due date intervals are assigned to achieve a certain objective, for instance, that a number of print requests in each container will be roughly the same. In addition, attributes of a print request other than the due date can be used to define the intervals associated with the containers. For example, other such attributes include, but are not limited to, estimated slack time, estimated lead time, or customer ranking, as will be further described later.

Sorting is performed to identify the relative priorities among the print requests within each container. An overall priority list of print requests is then generated by merging the priority lists in adjacent containers, as will be further described later. The top N print requests from the overall priority list are converted into a task-resource schedule, which is then released upon a periodic trigger signal, to a print production facility. The periodic trigger signals are employed to meet stochastic demand while managing smooth production flow. In one example, these periodic trigger signals are based on a TAKT timing scheme, as will be further described later in association with at least FIGS. 5 and 9A-9B. In some examples, production surveillance information from a production facility is obtained and used by the example production scheduler as real-time feedback information that is incorporated into a prioritized list of print requests.

In one example of a print production scheduler of the present disclosure, a first stage of sorting within each container and a second stage of sorting (that merges adjacent containers and creates the overall prioritized list of print requests across all containers) is performed according to a population-based, meta-heuristic optimization scheme. In one example, such optimization schemes include an evolutionary-based computation, meta-heuristic optimization scheme in which the priority sequence or order of print requests is represented by a chromosome. The suitability of a chromosome (e.g. a particular order of print requests) is evaluated relative to a fitness function, with better optimization solutions corresponding to those chromosomes having a higher fitness value among the full pool of chromosomes for a given generation. Repeated cycles of the evolutionary meta-heuristic yield the fittest chromosomes, which corresponds to the more optimal priority sequence by which the print requests should be ordered.

In some examples, a similar optimization scheme is employed to determine the task-resource schedule that is released to the production facility.

In another aspect, with the arrangement provided via examples of a production scheduler in the present disclosure, the initial sorting of print requests into different containers (e.g. due date containers) followed by the simultaneous sorting within each container enables massive parallelization of computing. This parallelization enables scalability through the quick determination of the relative priorities of the print requests within each due date container instead of attempting to sort priority with all the print requests in the pool waiting to be scheduled. In one example, the order is determined according to an order of the due date containers. As will be described later in association with at least FIGS. 3B-4B, the prioritized list of print requests of adjacent containers can be merged into one container to determine a globally-optimized, priority list of print requests from all containers. From this globally optimized ordered list, the system can then readily select a top N print requests that are to be fulfilled via a task-resource schedule according to a time interval, such as TAKT time interval, within the production facility.

In one aspect, the optimization scheme that supports the production scheduler also takes into account factors other than (or in addition to) due dates. Accordingly, examples of the present disclosure significantly exceed the performance of traditional rule-based heuristics used in automation solutions, such as earliest due date (EDD) which simply process print requests by giving the highest priority to the earliest due date, regardless of realities in the production facility and regardless of other factors such as job size, job complexity, buyer identity or status, etc. Other traditional automation management techniques also employ rules, such as shortest processing time (SPT) or minimum slack time. However, these traditional techniques based on static rules do not account for the diversity of types of jobs, diversity of the service level requirements, and dynamic factory production reality, handling many small jobs juxtaposed with very large jobs, and diverse business objectives. For instance, these objectives include (but are not limited to) maximizing production throughput, maximizing quality of services for a large and diverse customer set, and/or maximizing the utilization rates of the capital-intensive equipments such as printing presses.

In one aspect, different print production factories optimize their production scheduling with different business objectives in mind. Examples of a print production scheduling system according to the present disclosure are readily adaptable to different business objectives, and therefore can be employed in a wide variety of production factory schemes and can also adapt to the modification of business objectives of a given production factory.

In another aspect, by accounting for job size and complexity (among other parameters), example production schedulers in the present disclosure can accommodate and adapt to smaller custom jobs (each possibly having vastly different specifications) amidst large volume jobs without derailing the production intensity needed to complete the larger jobs in a timely and effective manner. Similarly, even when inundated with a wide variety of small custom jobs, a print service provider is able to still meet the high volume work it performs for larger customers, such as enterprise accounts.

In one aspect, examples of the production scheduler in the present disclosure are scalable. In other words, the manner in which the examples of the production scheduler optimizes printing production (e.g. the prioritized order of print requests, conversion into a task-resource schedule) is readily expandable to larger scale production facilities and/or reducible to small scale production facilities. This scalability is available without compromising the effectiveness and efficiency provided by the example production schedulers of the present disclosure.

In some examples, as new print requests are admitted to a production scheduler for fulfillment, these new print requests are added to a pool of print requests waiting to be scheduled for fulfillment. The production scheduler incrementally updates its optimization of the priority list of top N print requests. This accommodation is performed by inserting the new print request into the dispatcher when this new print request is admitted. This new print request is placed into an applicable container and subject to the ongoing sorting of all print requests in that container. In this way, entry of a new print request does not interrupt the sorting occurring in other due date containers and does not interrupt later sorting (including merging operations) across all due date containers, as well as subsequent phases such as producing a task-resource schedule and assigning tasks to different factory resources for fulfillment. Moreover, this arrangement avoids traditional automated scheduling methods in which intake of a new print request typically includes re-initiating computations from scratch. However, the examples of the present disclosure do provide an incremental approach in which the optimization scheme is able to incrementally incorporate the new print request into the sorting and optimization process while leveraging the already performed computations. In this way, the new print request is processed without having to start the sorting process all over again.

Some examples of a print production scheduler of the present disclosure employ real-time feedback information obtained from surveillance of a production facility, thereby enabling a production schedule to be tailored to actual conditions in the printing factory. While not exhaustive, in one example this feedback information includes a factory workload parameter, a process rework parameter, a resource interruption parameter, and a differential fulfillment parameter. In one example, the differential fulfillment parameter enables additional controls so that a print request is fulfilled on a different basis, such as the identity of the requester and/or according to the discretion of the operator.

In one example, a factory resource refers to any resource used to perform tasks to fulfill print requests, for instance, computing servers that perform computations to prepare the digital files ready for printing, print presses, finishing machines, workers that perform quality inspection, work cells that perform packaging and shipping, etc. A print factory has a finite capacity of each type of resources. One objective of the production optimization via the examples of the production scheduler in the present disclosure is to prioritize and use of the resources such that the factory's business objectives are met.

Accordingly, in one example, the factory workload parameter tracks an up-to-the-moment workload for each resource on the factory floor, whereas a traditional scheduling approach assumes that all resources are either free or that all resources have utilization rates corresponding to pre-estimated static numbers. In another example, the process rework parameter tracks failure of production processes resulting in rework, i.e. performing the print request a second time. In contrast, a traditional scheduling approach assumes an ideal production process, which does not account for such process rework and ignores the process rework failure mode, or at best uses a static number to represent the additional workload resulting in rework. In one example, the resource interruption parameter tracks the interruption of resources due to machine failure, consumable replenishment and maintenance activities that result in the resources being temporarily taken out of service. In contrast, a traditional scheduling approach assumes that such resource interruptions do not take place, and therefore ignores this failure mode.

Traditional management techniques result in larger inventories, larger accumulations of work-in-process, larger lead times, more shipping upgrades to compensate for late production, and/or more ad hoc interventions by a production manager. Together these inefficiencies cause increased production costs and deteriorated goodwill from the customers, and can affect business success. However, by employing real-time feedback information from a production facility, examples of a production scheduler in the present disclosure overcome the inefficiencies and ineffectiveness associated with a traditional management-production mismatch in which the production goals do not match the reality of what is actually occurring in real-time in a factory or production facility.

Moreover, the dynamic nature of the examples of a production scheduler in the present disclosure also overcome the deficiencies of traditional approaches that model production as a flexible job shop while using static inputs, static constraints, and static solutions.

Taken together, the functions, components, and modules in at least some examples in the present disclosure provide a high speed, scalable print production system that dynamically responds to varied demand and real-time factory activities. These examples, and additional examples, are further described in association with FIGS. 1-11.

FIG. 1 is block diagram schematically illustrating one example of a print production system 10 of the present disclosure. As shown in FIG. 1, system 10 includes a production scheduler 12, a production facility 14, and an array 20 of print service requesters 22, 24, 26, 28. In general terms, the production scheduler 12 receives print requests 30 from the requesters 22, 24, 26, 28 and produces a schedule by which the production facility 14 can most effectively and efficiently fulfill the requests. In one example, print requests are admitted through an array of different methods including: a store front 20 such as a bricks-and-mortar print service shop where a customer visits this print factory in person and submits print requests; a web-to-print interface 24 where a customer can submit their print requests electronically through a network communication link (FIG. 2B); an enterprise customer 26 that may submit its print requests through a dedicated customer service representative assigned to this account; and other methods 28. In general terms, the print request 30 includes parameters 32 and due date information 34. The print request also can be referred to as print order. Parameters 32 specify details about the print request and the requisite data such as associated digital files (for instance, photos image files). A print request can make a request to print one product or more than one product. Moreover, in some examples, the parameters 32 also can be expressed as a production plan, in which the print request provides precise details regarding how the requested product is to be produced.

Upon receiving multiple print requests 30, production scheduler 12 optimizes a schedule by which the various print requests can be completed in a timely and efficient manner, while maximizing business objectives, for instance, maximizing production throughput, maximizing quality of services for a large and diverse customer set, and/or maximizing the utilization rates of the capital-intensive equipments such as printing presses. This optimization process results in production scheduler 12 producing a production schedule 40 and then releasing it to production facility 14. In general terms, the production schedule 40 provides a sequence of tasks to be performed by production facility 14, while accounting for resource assignment factors 42 and priority factors 44. In one aspect, production scheduler 12 operates as an automated production tool to enable automated production at the production facility. Production facility 14 includes resources 50, 52 for executing the tasks according to the production schedule 40. In general terms, the production facility 14 provides print production using a wide variety of types and sizes of printers and presses, computing servers, finishing equipments and other resources. Printing may be performed using analog resources and/or digital resources, as well as hybrid resources including hybrid and digital components.

Various aspects of system 10, including production scheduler 12, are more fully described below in association with FIGS. 2A-11.

Figure 2A:
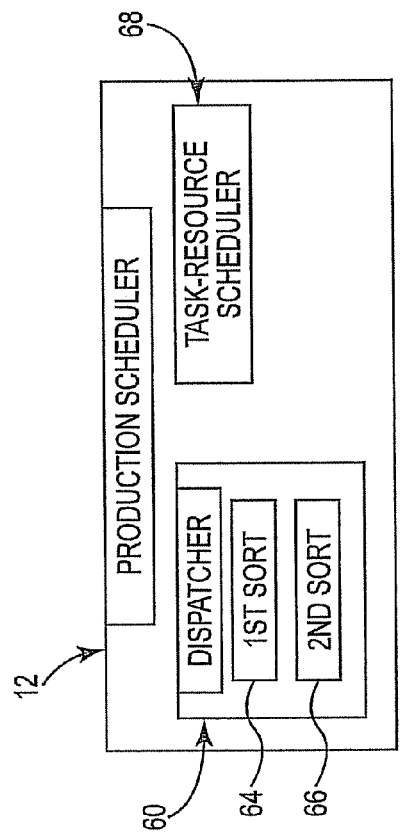
FIG. 2A is a block diagram schematically illustrating one example production scheduler in the present disclosure.

FIG. 2A schematically illustrates one example of a production scheduler 12 of the present disclosure. As shown in FIG. 2A, production scheduler 12 includes a dispatcher module 60 and a task-resource scheduler module 68. The dispatcher module 60 includes a first sort function 64 and a second sort function 66. In general terms, dispatcher module 60 receives the print requests and organizes multiple print requests into separate groups, each of which are associated with an attribute-defined interval.

In one example, the attribute defining the interval is a time-based attribute, such as a due date, estimated slack time or estimated lead time. In yet another example, the attribute by which intervals are defined is not a time-based attribute but relates to other factors, such as an internal ranking (made by the print service provider) of a customer based on volume, money, identity, etc. In some examples, a single interval criterion is formed from combinations of more than one of the various attributes for defining the interval. In some examples, the various attributes may be weighted differently on the discretion of the operator of the production scheduler 12.

In general terms, by establishing a series of groups according to consecutive intervals, the system effectively partitions an entire pool of print requests, and thereby establishes at least the initial relative priorities among the print requests. In general terms, the first sort function 62 operates on each group of print requests separately and determines the relative priorities among all print requests in the group, based on multiple factors. In general terms, the second sort function 64 merges the priority lists from each group and generates a global priority list that documents the relative priorities among all print requests waiting to be scheduled for fulfillment. In general terms, a top number of the print requests from this global priority list are released to the task-resource scheduler for scheduling. In general terms, the task-resource scheduler 68 determines a task-resource schedule by which the priority list of the top number of the print requests can be fulfilled most effectively. In one example, this task-resource schedule 40 is released to production facility 14. These aspects, and additional aspects of production scheduler 12, are described in more detail in association with at least FIGS. 3A-5.

FIG. 2B schematically illustrates one example of a print production system 70 of the present disclosure. In one example, system 70 includes at least substantially the same features and attributes as system 10 described in association with FIG. 1. In one example, production scheduler 12 includes at least substantially the same features and attributes as previously described in association with FIG. 2A and additionally includes the features described in association with FIG. 2B.

As shown in FIG. 2B, system 70 further demonstrates one example by which requesters (22, 24, 26, 28), production scheduler 12, and production facility 14 communicate with each other. As shown in FIG. 2B, system 70 includes a network communication link 78, such as internet communication link 79, intranet link, whether wired or wireless, as well as other communication protocols by which requesters (22, 24, 26, 28), production scheduler 12, and production facility 14 can communication with each other.

As shown in FIG. 2B, in one example, the production scheduler 12 includes and/or is embodied as a server 80, in another example, production scheduler 12 is provided via the cloud 82 via cloud computing resources provided via: (1) infrastructure as a service (IaaS); (2) platform as a service (PaaS); (3) software as a service (SaaS); or (4) a hybrid form of cloud-based services. Whether provided via a server 80 or via cloud 82, in one example production scheduler 12 includes controller 84, memory 85, and user interface 86.

In one example, controller 84 comprises at least one processor and associated memories to generate control signals directing the operation of components of system 10 in FIG. 1 (including at least production scheduler 12 in FIGS. 1 and 2A) and system 70 in FIG. 2B. In particular, in response to or based upon commands received via user interface 86 and/or machine readable instructions (including software) contained in the memory 85 associated with controller 84, controller 84 generates control signals directing operation of production scheduler 12 shown in FIGS. 2A-2B. In one example, controller 84 is embodied in a general purpose computer.

For purposes of this application, in reference to the controller 84, the term "processor" shall mean a presently developed or future developed processor that executes sequences of machine readable instructions or programming instructions (such as but not limited to software) contained in a memory. Execution of the sequences of machine readable instructions causes the processor to perform actions, such as operating the production scheduler 12 (FIGS. 2A-2B) and its associated components, modules, and functions in the manner described in the examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 85. In one example, memory 85 comprises a computer readable medium providing non-volatile storage of the programming instructions or machine readable instructions executable by a process of controller 84. In other examples, hard wired circuitry may be used in place of or in combination with machine readable instructions (including software) to implement the functions described. For example, controller 84 may be embodied as part of at least one application-specific integrated circuit (ASIC). Unless otherwise specifically noted, the controller 84 is not limited to any specific combination of hardware circuitry and machine readable instructions (including software), nor limited to any particular source for the machine readable instructions executed by the processor of controller 84.

In one example, user interface 86 of server 80 comprises a graphical user interface or other display that provides for the simultaneous display, activation, and/or operation of the various components, functions, features, and modules of server 80, described in association with at least FIG. 2. Moreover, it will be understood that the features, functions, modules, and components of the production scheduler 12 and related functions, modules, and components of system 10 can be arranged in different forms and groupings, and therefore production scheduler 12 is not strictly limited to the particular arrangement or groupings of functions illustrated in FIGS. 2A-2B.

FIGS. 2C and 2D further illustrate some examples regarding how production scheduler 12 and production facility 14 relate to each other. In one example, as shown in FIG. 2C, a single print service provider 90 includes both production scheduler 12 and production facility 14, which may or may not be physically co-located. Moreover, in one such example, the print service provider 90 includes multiple production facilities 14 with one production scheduler 12 that manages production among all the multiple production facilities 14. Alternatively, in another example, the print service provider 90 includes multiple production schedulers 12 and multiple production facilities 14, with each production scheduler 12 managing a corresponding production facility 14.

In another example, as shown in FIG. 2D, one print service provider 95 includes at least one production scheduler 12 while another print service provider 97 includes at least one production facility 14. In this arrangement, the production scheduler 12 of one print service provider 95 manages the production facility 14 (or production faculties 14) of the other print service provider 97. Via a direct or indirect communication pathway 98, the production scheduler 12 provides production schedules to direct the operation of production facility 14.

FIG. 3A is a block diagram schematically illustrating one example of a first sort function 104 of a dispatcher module 100 in the present disclosure. In one embodiment, first sort function 104 of dispatcher module 100 includes at least substantially the same features and attributes as first sort function 64 of dispatcher module 60 of FIG. 2A. As shown in FIG. 3A, first sort function 104 includes a series 121 of containers 120 that hold print requests 122. In one example, each container 120 holds generally the same number of print requests. In one aspect, each container 120 is associated with one interval in an array 130 of intervals 131-135. The intervals 131-135 are arranged in order according to the interval criteria 140.

As shown in FIG. 3A, in one example the interval criteria 140 includes a due date attribute 141, an estimated slack time attribute 142, a estimated lead time attribute 143, and an internal ranking attribute 144.

In one example, the due date attribute 141 uses a customer-determined due date of a print request to define the intervals 131-135. In this case, the due date interval is measured by some period of time, such as minutes, hours, ½ days, eight hour shifts, days, weeks, etc. The number of intervals can be greater or less than the example of five intervals shown in FIG. 3A.

In one example, the respective intervals 131-135 are of a generally uniform period of time. For example, if the base interval is eight hours, then the first interval would be 0 to 8 hours, the second interval would be 8 to 16 hours, the third interval would be 16 to 24 hours, etc.

However, in another example, at least some of the containers have a due date interval that covers a shorter or longer due date interval than other containers. For instance, a base interval can be two days with each of $1^{st}$, $2^{nd}$, $3^{rd}$, and $4^{th}$ intervals being two days long and the $5^{th}$ interval covering an entire week. Moreover, in some examples, more than one interval can cover a different time period. In some examples, the first interval covers a longer period of time than the later intervals.

In one example in which the due date attribute is employed, a print request is placed into a due date container if the due date of this print request falls into the due date interval corresponding to this due date container. A print request is assigned to a due date container once it is admitted for processing by the production scheduler 12.

In another example, the estimated slack time attribute 142 is employed to define intervals 131-135. In one example, the estimate lead time attribute 143 is employed to define intervals 131-135. In another example, the internal ranking attribute 144 defines intervals 131-135 based on a ranking of customers (based on factors such as money, volume, identity, and/or location, etc.) made by the print service provider. As previously mentioned, in one example these attributes can be combined in a variety of ways with the combined attributes defining a single, composite interval criteria for defining intervals 131-135.

In one aspect, the initial action by the dispatcher module 100 of partitioning the pool of admitted print requests into different containers (arranged via consecutive intervals) at least initially establishes relative priorities among those print requests according to the attribute (e.g. due date) that defines the intervals.

In one aspect, after this initial partitioning action, First sort function 104 of dispatcher module 100 performs further sorting within each container 120. In particular, first sort function 104 seeks an ordered priority within each container 120 that ranks all the print requests within this container according to their relative priorities. To do so, first sort function 104 continually and iteratively applies an optimization scheme, as represented by indicator 126, to the available print requests in each container 120 so that there is always an up-to-date prioritized list of all print requests within this container 120 at any given time. In one aspect, the term "continually" means that the optimization scheme runs continuously except for authorized suspension of the optimization routine. In one example, an authorized suspension includes the receipt of a new print request 123 at which time the dispatcher module 100 executes a routine for handling new print requests and temporarily modifies the optimization routine. One example of such a routine for handling a new print request 123 is later described in more detail. In another example, an authorized suspension of the optimization scheme occurs each time a clock periodically (for instance, with the time internal defined by TAKT time) issues a trigger event (for instance, TAKT event) to prompt the dispatcher module 100 to perform certain actions, such as releasing a prioritized list of print requests and removing those print requests that have been released to a production facility from the corresponding containers 120. One example of the dispatcher module 100 responding to such a trigger event is later described in more detail in association with at least FIGS. 9A-9B.

In performing the optimization, the dispatcher module 60 considers various factors regarding the print requests. Some of these factors include due date, the complexity, size, and/or quantity of products in the print requests, preferred customer priority, resource capabilities of the production facility, etc. Regarding the due date, it will be understood that even though a print request has been placed into a container because its due date fell within a particular interval, the due dates of the print requests within a particular container will vary and therefore in one example, print requests within a container can be at least initially sorted into a prioritized list by an earliest due date (EDD) rule or other sorting rule so that a prioritized list for all print requests always exist in a container.

In one aspect, by providing a series of due date containers 120 of first sort function 104 of dispatcher module 100 provides a massively parallelized computation scheme, in which an entire pool of print requests (to be scheduled) is partitioned into many smaller trunks using the attribute-defined interval (e.g. due date interval, slack time interval, etc.). Among other benefits, this partitioning provides initial priority sorting, which contributes to the high speed operation of production scheduler 12, via the massive parallelization applied via the first and second sort functions 104, 106. In at least some examples, the due date intervals 131-135 (corresponding to the due date containers 120) are chosen so that that all due date containers 120 have generally the same number of products, which in turn, acts to load-balance the parallelized computation by which the priority of print requests within each container is sorted. In one example, the optimization scheme applied by first sort function 104 to each of the due date containers 120 is a population-based meta-heuristic optimization scheme. In one example, the population-based optimization scheme includes an evolutionary-based or genetic-based computation scheme. In another example, the population-based optimization scheme includes other types of schemes, such as but not limited to, a particle swarm optimization scheme, or ant colony optimization scheme. One example of an evolutionary-based computation optimization scheme as applied via first sort function 104 is further described in association with at least FIGS. 8A-8C.

In one example, the dispatcher module 100 includes a distribution parameter 147 and a classification function 148, as shown in FIG. 4A. While the distribution parameter 147 and classification function 148 are juxtaposed with second sort function 106 in FIG. 4A, it will be understood that the distribution parameter 147 and classification function 148 can be viewed as operating adjacent the end of operation of first sort function 104, adjacent the beginning of operation of second sort function 106, or intermediately between the operations of the respective first and second sort functions 104, 106.

In one example, in general terms the distribution parameter 147 and classification function 148 of dispatcher module 100 leverage the results of the first sort function 104 to facilitate operation of the second sort function 106, as further described below.

With this in mind, FIG. 3B is a diagram 151 schematically illustrating the results of sorting performed via first sorting function 104 and displayed according to distribution parameter 147 and/or classification function 148, according to one example of the present disclosure. As shown in FIG. 3B, a pool of print requests 122 was partitioned into three different containers 150A, 150B, 150C according to an interval in a manner substantially the same as previously described. Via distribution parameter 147, priority scales 152, 153 are associated with each container 150A, 150B, 150B to represent the relative priorities of print requests 122 within a given container. The priority scale 152 represents a continuum of priority (lower 156 to higher 154). Accordingly, the relative priorities in a container, such as container 150A, are distributed with the higher priority print requests 122 placed to the upper left and with lower priority print requests to the lower right. Accordingly, via distribution parameter 147, this graphical representation in diagram 151 of the relative priorities of print requests 122 produces recognizable distribution patterns of the print requests 122 within a respective container 150A, 150B, 150C.

Based on the particular distribution pattern of the print requests 122 at a given point in time, the classification function 148 classifies the relative priorities of print requests 122 within each container 150A, 150B, 150C into several different batches or sections. In one example, via classification function 148, the print requests 122 within a given container have been classified into a head portion 157, a body portion 158, and a tail portion 159 according to the fitness value. In one example as shown in FIG. 3B, in container 150A the head portion 157 includes two print requests 122, body portion 158 includes two print requests 122, and a tail portion 159 includes one print request 122 with dashed lines 160, 161 representing the virtual partitions separating the head portion 157, body portion 158, and tail portion 159. In this way, the classification function 148 further establishes relative priorities via partitioning print requests 122 within a given container.

In another aspect, FIG. 3B further graphically represents that the containers 150A, 150B, 150C are arranged in order of priority (with reference to vertical scale 163 and horizontal scale 164) in which the higher priority print requests are located in the upper left region with diagram 151, and lower priority requests are located in the lower right region within diagram 151. Accordingly, a quick look at diagram 151 reveals that in one snapshot of time (at least in this initial stage of operation of dispatcher module 100) the all print requests 122 in container 150A are generally of higher priority than the all the print requests 122 in container 150B or container 1500, and that within each container 150A, 150B, 150C, the print requests 122 toward the upper left are of higher priority than those toward the lower right.

In another example, FIG. 3B further illustrates that the classification function 148 (FIG. 4A) may employ different classification schemes in each respective container 150A, 150B, 150C depending on the particular distribution of relative priorities of print requests 122 in a given container. For example, in container 150C as shown in FIG. 3B, no print requests 122 fall within a middle region while two print requests 122 are located near the upper left region of container 150C and three print requests 122 are near the lower right region of container 150C. Accordingly, based on this distribution of print requests 122 within container 105C, the classification function 148 (FIG. 4A) determines that a single partition will be applied to form two classes: a head portion 157 and a tail portion 159 but no body portion 158 because no print requests fell within the middle area of the priority range.

Moreover, in another example, as shown in container 150B of FIG. 3B, the size of classes within a container need not be uniform. In particular, with three print requests 122 dominating the middle region of container 150B and with one print request 122 at a far upper left region and one print request 122 at a far lower right region, the classification function 148 (FIG. 4A) determines that three classes should exist but that the head portion 157 and tail portion 159 will be small in size with a relatively larger body portion 158 interposed therebetween. While not shown in FIG. 3B, other variations can be used. For example, if all the print requests (e.g. 5 print requests) are grouped together near a center region of a given container, then the classification function will provide a body portion 158 but omit the head and tail portions 157, 159.

With this framework in mind, the information obtained via operation of distribution parameter 147 and/or classification function 148 is used in association with at least second sort function 106, as further described below.

FIG. 4A schematically illustrates one example of a second sort function 106 of a dispatcher module 100 in the present disclosure. In one embodiment, second sort function 106 of dispatcher module 100 includes at least substantially the same features and attributes as second sort function 66 of dispatcher module 60 of FIG. 2A. In general terms, second sort function 106 uses the results of operation by first sort function 104 to further generate the globally prioritized list of print requests, a subset of which is, the prioritized list containing the top N prioritized print requests 175 that will be released to a production facility (after processing by task-resource scheduler 68) in the form of a task-resource schedule.

With this in mind, as shown in FIG. 4A, second sort function 106 merges the various containers 120 together into a single virtual container 170 so that a global prioritized list of print requests from among all the containers 120 can be obtained. While not representing a physical phenomenon, dashed zipper lines 152 schematically represent the stitching together or merging of the prioritized lists of print requests residing in adjacent containers 120 to enable the generation of the global prioritized list of the print requests among all containers 120.

In one example, the second sort function 106 applies similar priority criteria as first sort function 104 to determine the global prioritized list of print requests among all containers 120 and also utilizes an optimization scheme to do so. In one example, the second sort function 106 includes at least substantially the same features and attributes of the optimization schemes previously described for first sort function 106. However, it will be understood that in other examples, the second sort function 106 applies a different sorting optimization scheme than the sorting optimization scheme employed by first sort function 104.

In one example, this second round of massively parallelized optimization applied via second sort function 106 is applied to adjacent pairs of containers 120 by leveraging the results of the operation of classification function 148 (FIG. 4A) to each container (e.g. container 150A, 150B) as shown in FIG. 3B. In particular, as shown in at least FIG. 4B, an optimization function 129 is applied over the print requests near the border of two adjacent due date containers 120, such as the tail portion 159 of one container 150A and the head portion 157 of a neighboring container 150B. This approach effectively results in the merging of the two prioritized list of print requests 122 residing in these two adjacent containers into one global prioritized list of all print requests in these two containers. The optimization sorting function 129 is applied to this pool of print requests formed from the head portion and tail portion of adjacent containers. In one aspect, the merging action is represented by the zipper-like dashed lines 172 between adjacent containers 120 in FIG. 4A and by dashed lines 155 in FIG. 4B. In another aspect, for a total of M containers, there are (M−1) merge operations. Parallel execution of this aforementioned merge and optimization procedures over all adjacent pair of containers 120 will generate the global prioritized list of the print requests among all containers 120.

In one example, the number (N) of print requests 122 included in the prioritized list 175 to be released from dispatcher module 100 as shown in FIG. 4AI is determined according to a new "print request" arrival rate and the time interval between two release events (e.g., TAKT time), designated as N (e.g., TAKT quantity). In particular, it is expected that new print requests regularly will be received by dispatcher module 100 of production scheduler 12. Accordingly, in one example, production scheduler 12 operates by the criteria that its production schedule 40 (FIG. 1) which is released at a time interval will include at least the same number of print requests as the number of new print requests received by dispatcher module 100 within one of the preceding time intervals. In this way, production scheduler 12 ensures that the production scheduler 12 processes print requests quickly enough to ensure that the production facility 14 can, at the least, satisfy the current demand.

In another example, the production scheduler 12 admits new print requests based on a stochastic basis. More complex schemes are applied to calculate N based on past and forecasted future arrival patterns of the print requests. In this way, N will be chosen by production scheduler 12 to ensure that the production rate meets the rate of the arrival rate of the new print requests while achieving smooth production flow. In another aspect, it will be understood that production scheduler 12, including dispatcher module 100, operates in a process-oriented environment such that processing by production scheduler 12 is performed in a metered way. In one example, this metering is executed according to a time interval such as a TAKT trigger signal that provides trigger signals at regular intervals and by which various modules, components, etc. can operate in a synchronized manner while achieving more predictable throughout and efficient resource utilization. More details regarding the use of a TAKT trigger signal in association with dispatcher module 100, and system 100 in general, is later described in association with FIGS. 9A, 9B.

FIG. 5 is a block diagram of one example of a portion of a print production system, including a task-resource scheduler 180, in the present disclosure. In one embodiment, task-resource scheduler 180 includes at least substantially the same features and attributes as task-resource scheduler 68 of dispatcher module 60, as previously described in association with FIG. 2A. As shown in FIG. 5, in one example task-resource scheduler 180 includes a conversion function 182 and optimization function 184. In general terms, task-resource scheduler 180 receives a priority list 175 of top N print requests from dispatcher module 100 in FIG. 4A (dispatcher module 60 in FIGS. 2A-2B) and converts this priority list 175 into a task-resource schedule 190 that is released, at periodic trigger signal 186, to production facility 14 for print production. In one example, conversion function 182 examines the detailed parameters of each print request in the ordered list 160, while being cognizant of the priority valuation associated with each print request in the list. Using this information, conversion function 182 develops a production plan for each print request.

Figure 7A:
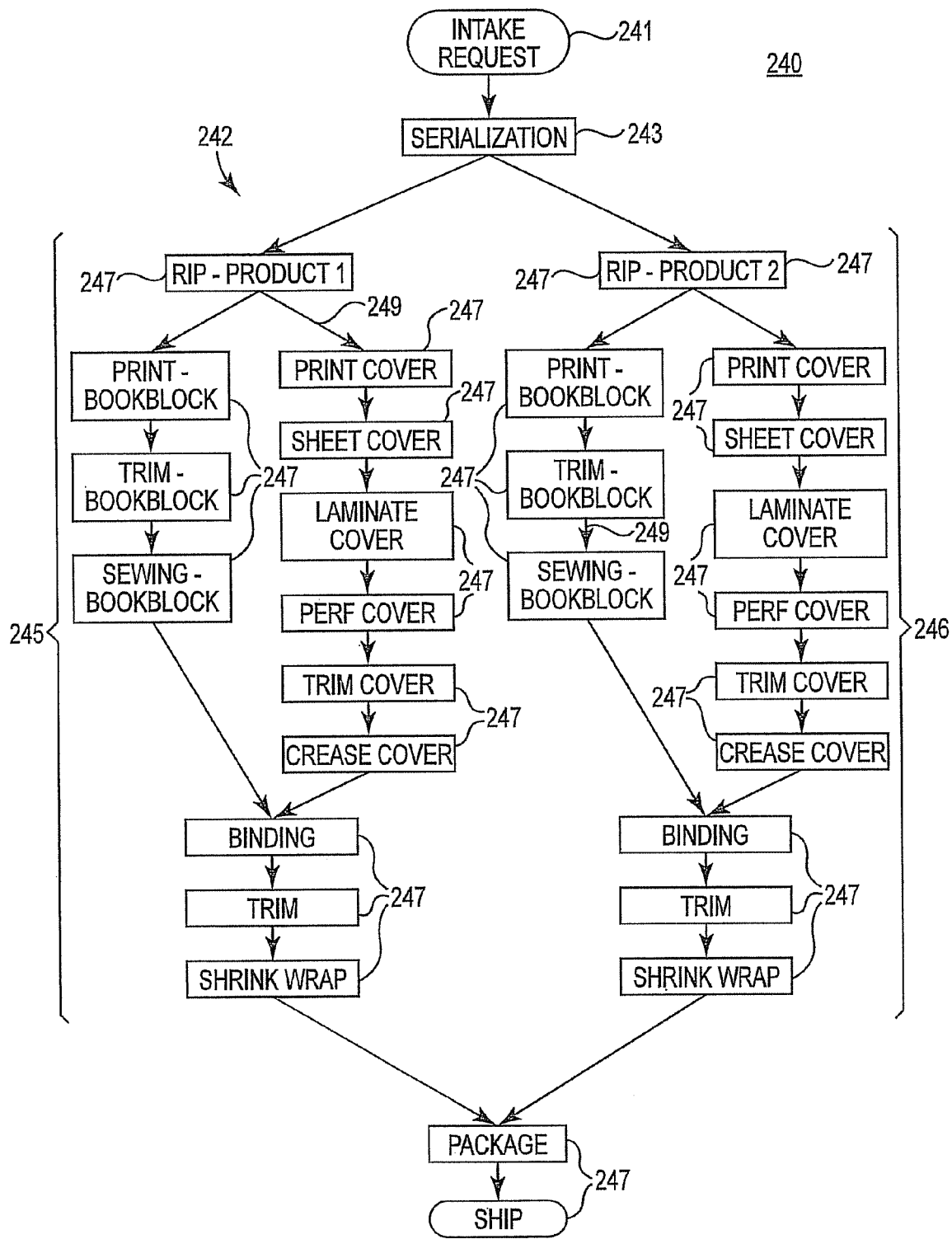
FIG. 7A is a diagram that schematically illustrates a production plan via a sequence graph, according to an example of the present disclosure.

In one example, a production plan may be described as a sequence graph, such as graph 242 in the schematic diagram 240 of FIG. 7A. As shown in FIG. 7A, a print request is received via intake 241 and undergoes serialization at 243 to determine the tasks 247 to be done. An appropriate number of production flow pathways 245, 246 are determined, each of which include a sequence of tasks 247 (or parallel sequences of tasks 247). In one aspect, tasks 247 are represented as nodes of graph 242 and directed edges (e.g. 249) that link two nodes (e.g. representing tasks 247) describe the precedence constraints, by which one task 247 has to be completed before the other task 247 can be executed. In another aspect, each task 247 needs to be executed by an appropriate resource in the production facility 14 with example resources including (but not limited to) computing servers, printing presses, finishing equipments, packaging and shipping stations, etc.

Figure 7B:
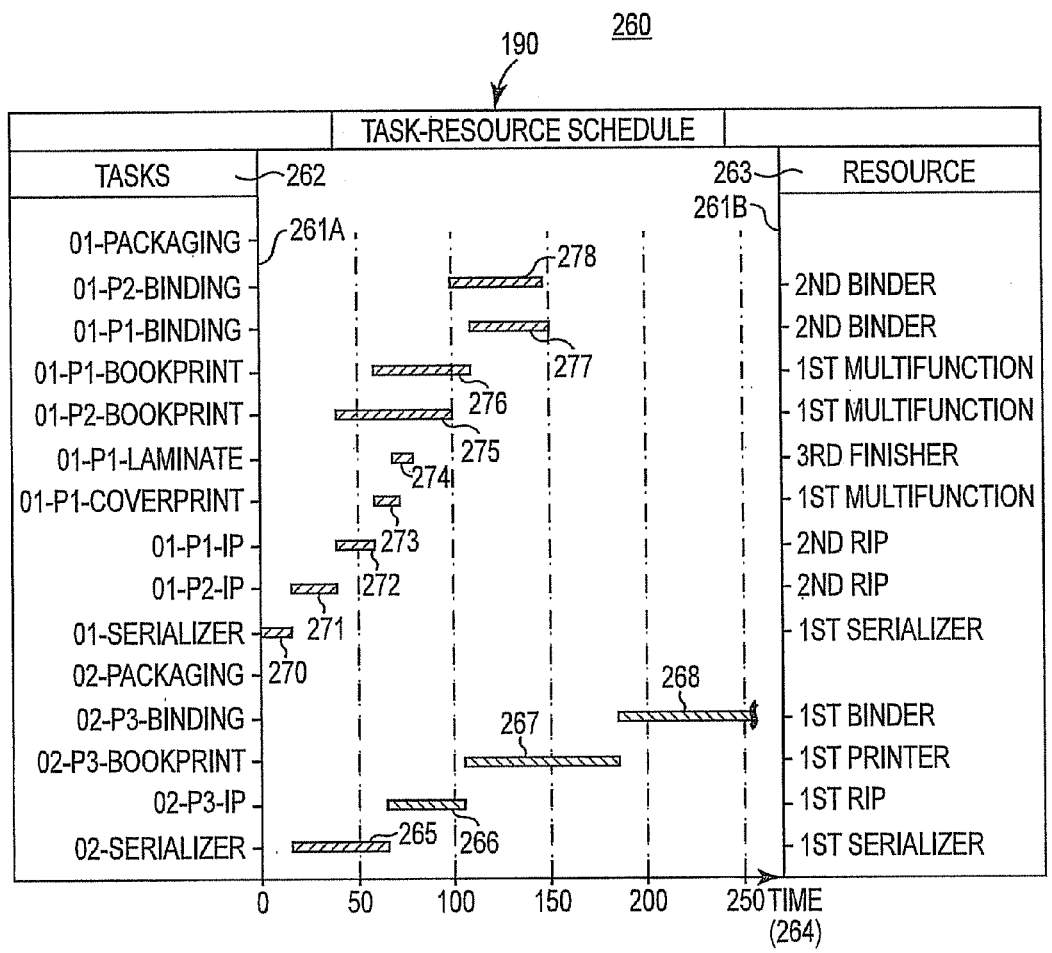
FIG. 7B is a chart schematically illustrating a task-resource schedule, according to one example of the present disclosure.

According, with further reference to FIG. 5, via conversion function 182, the task-resource scheduler 180 assigns each task to a resource that is equipped to execute this task. In one example, a resulting task-resource schedule 190 is produced and is schematically illustrated in FIG. 7B, as will be further described below. In examples in which multiple resources are available to execute the same task, the optimization function 184 is deployed to identify which resource (of the multiple suitable resources) that maximizes the print factory's business objective. In another example in which multiple tasks are assigned to the same resource, then the optimization function 184 is deployed to generate the prioritized list of the tasks that determine the sequence by which these tasks will be executed by the particular resource so that the print factory's business objective is maximized. The task-resource schedule 190 including both the resource assignment and task prioritization for all the N print requests is then released to direct the production facility 14 to fulfill the print requests. Although the term "sequence" is used, it will be understood that some tasks can be performed in parallel (or in an overlapping time period) provided that the overall effect of ordering the tasks results in the highest priority print requests being executed first. However, it will be understood that a task started earlier may not necessarily be completed earlier than other tasks.

FIG. 7B is a diagram 260 schematically illustrating of a task-resource schedule 190 produced via task-resource scheduler 180, according to one example of the present disclosure. As shown in FIG. 7, diagram 260 includes a graph in which a task-resource schedule 190 of tasks 262 is plotted along a first Y-axis (261A), time 264 is plotted along the X-axis, and resource assignments are plotted along a second Y-axis (261B). Each task 262 is labeled according to a print request or order number (e.g. order one is O1, order two is O2, etc.) and the various products are labeled (e.g. Product one is P1, Product two is P2, etc.). Finally, each task includes the particular production task (e.g. serialization, raster image processing (IP), bookprint, trimming, sewing, perforating, binding, covering, other finishing tasks, packaging, etc.) for a given product. On the other side of the graph, a resource 263 is assigned for a particular task. At a particular period of time, a given task will be performed by a particular resource, such that a task-resource event occurs as represented by bars 265-268 and bars 270-278. In one aspect, a task-resource event identifies, for a particular time period (along the time axis 264) which task 252 is being performed and which resource 263 is performing the task. For example, task-resource events 270-278 relate to Products one and two (P1, P2) of Order one while tasks 265-268 relate to Product three in Order Two. As shown by diagram 260, the tasks 265-268 and 270-278 are arranged in sequence (as represented by X-axis) in a manner to most effectively and efficiently complete all the tasks to produce the entire ordered list of highest priority print requests for a particular production interval while maximizing the use of available resources in a manner that maximizes the facility's business objectives. In assigning a particular resource, multiple factors are taken into consideration as previously described and as further described below in association with at least FIGS. 6B and 9A-9B.

In one aspect, the task-resource schedule 190 represented in diagram 260 (FIG. 7B) corresponds to an optimal solution achieved via optimization function 184 of task-resource scheduler 180 (FIG. 5), according to one example in the present disclosure. In one aspect, the conversion function 182 performs its sorting of the order of tasks and assignment of tasks to suitable resources to produce the task-resource schedule 190 via application of optimization function 184. In general terms, optimization function 184 sorts among different solutions to find the most effective sequence of tasks and resource assignment (to perform the prioritized list of top N print requests) on the print production floor. Among other considerations, the conversion function 182, as supported via optimization function 184, weighs resource availability, resource capability, task priority, etc. in order to produce the task-resource schedule. At least some of these parameters applied as part of the optimization function 184 are further described in association with at least FIGS. 6A-6B.

In one example, the optimization scheme applied by function 184 (FIG. 5) is a population-based meta-heuristic optimization scheme. In one example, the population-based optimization scheme includes an evolutionary-based or genetic-based computation scheme. In another example, the population-based optimization scheme includes other types of schemes, such as but not limited to, a particle swarm optimization scheme, or an ant colony optimization scheme. One example of an evolutionary-based computation optimization scheme as applied via optimization function 184 is further described in association with at least FIGS. 8A-8C. In addition, in some examples, the optimization function 184 operates according to substantially the same optimization scheme as first sort function (FIG. 3A) and second sort function 106 (FIG. 4A). In other examples, the optimization function 184 operates according to optimization schemes other than those employed by first sort function 104 (FIG. 3A) or second sort function 106 (FIG. 4A)

FIG. 6A is a block diagram of one example of a task-resource scheduler 200 in an example print production system in the present disclosure. In one embodiment, task-resource scheduler 200 includes at least substantially the same features and attributes as task-resource scheduler 68, 180 as previously described in association with FIGS. 2A and 5, respectively.

As shown in FIG. 6A, task-resource scheduler 200 includes an operations assessment function 210, which in general terms, considers in real-time information from production facility 14 to further enhance the effectiveness of the task-resource schedule 190. In one example, operations assessment function 210 includes a real-time factory workload parameter 211, a process rework parameter 212, a resource interruption parameter 214, and a differential fulfillment parameter 216.

In one example, the factory workload parameter 211 tracks in real-time the overall workload of production facility 14 and the workload of each resource (e.g. printer(s), binder(s), etc.) of production facility 4. This information provides a much more accurate assessment of the operations occurring in production facility 14 than using assumed, static utilization rates, which typically occurs in traditional production scheduling. In one example, the workload situation of a resource is characterized as a single number, a group of numbers, multiple mathematical functions, or statistical distributions with tunable parameters. These quantitative measures are dynamically refreshed as the factory production progresses, and define this factory workload parameter 211. In one example, this factory workload parameter 211 is implemented by a relational database table that documents the production events for all resources.

In another example, the process rework parameter 212 tracks process failures that cause a print request or part of a print request to be redone. For instance, a process failure could include using the wrong cover on a book, including the wrong data etc. Among other consequences, a process failure places an additional load on the production facility 14 because it will need to re-perform a particular print request. In one example, the failure of a resource is characterized as a single number, a group of numbers, multiple mathematical functions, or statistical distributions with tunable parameters. These quantitative measures are dynamically refreshed as the factory production progresses, and define this factory process rework parameter 212. In one example, this factory process rework parameter is implemented by a relational database table that documents the all the process failure events occurred in the factory production.

In one example, the resource interruption parameter 214 tracks which resources are not functioning due to some form of interruption and also track the extent of the ongoing interruption or past interruption. Such interruptions include, but are not limited to, maintenance, replacement of consumables (e.g. paper rolls, inks, etc.), machine failure, etc. In some instances, the resource interruption parameter 214 tracks the estimated time before a particular resource is back "on-line" and available for use. In one example, the interruption of a resource is characterized as a single number, a group of numbers, multiple mathematical functions, or statistical distributions with tunable parameters. These quantitative measures are dynamically refreshed as the factory production progresses, and define this resource interruption parameter 214. In one example, this resource interruption parameter 214 is implemented by a relational database table that documents the all the interruption events for all the resources in the factory.

In one example, the differential fulfillment parameter 216 tracks which print requests (or products within an order) are to be fulfilled according to a discretionary preference applied by the print production system on behalf of a particular customer. In other words, a preference can be shown to a particular customer, which results in their print request being treated differently in developing task-resource schedule 190. Accordingly, via differential fulfillment parameter 216, an operator can cause production facility 14 to override a portion of an automatically generated production schedule to have a print request fulfilled on a different basis for a particular customer. The differential fulfillment parameter 216 can take these scenarios into account when providing an operations assessment as part of developing and optimizing a task-resource schedule for the next time interval at which the task-resource schedule 190 will be released to the production facility 14.

FIG. 6B is a block diagram schematically illustrating one example of a portion of a print production system 220 in the present disclosure, with particular attention paid to an information feedback loop 221 from the production facility 14 to the production scheduler 222. In one example, the feedback loop 221 shown in FIG. 6B conveys information regarding parameters 211-216 of operations assessment function 210 (FIG. 6A) from production facility 14 to task-resource scheduler 200. In one example, production scheduler 222 includes at least substantially the same features and benefits as previously described in association with at least FIGS. 1 and 2A.

As shown in FIG. 6B, system 220 includes a production scheduler 222 including an operations assessment 224 and a production facility 14. The system 220 includes a production surveillance module 230 that obtains details from production facility 14 according to a resource utilization parameter 232, an order/product/part tracking parameter 234, a work-in-progress parameter 236, a unit performance parameter 237, and an exception event parameter 238. It will be understood that these parameters 232-238 are not an exhaustive list of the information regarding production facility 14 under surveillance by production surveillance module 230.

In one example, the resource utilization parameter 232 tracks the degree to which a resource is being utilized over an extended period of time and in real-time. In some examples, this resource utilization parameter 232 cooperates with and/or forms part of workload parameter 211 of operations assessment function 210 in FIG. 6A. Meanwhile, in one example, the order/product/part tracking parameter 234 tracks the progress and location of an order, a product and/or part (related to the product and order) within the production facility 14 and in particular, in relation to the task-resource schedule 190 currently being executed. In another example, the work-in-progress parameter 236 tracks tasks which already have been assigned to a resource and are waiting in queue to be processed by this particular resource. In one example, the unit performance parameter 237 tracks the speed of a resource to perform a unit of task, for example, number of sheets being printed per minute is documented as unit performance parameter 237 for a print press. The unit performance parameter 237 may change with time and provides a lead indicator to a possible occurrence of resource maintenance request.

In one example, the exception event parameter 238 tracks the activities that cause, and circumstances surrounding, process failures that result in rework, which is in turn, tracked via rework parameter 212 of operations assessment function 210 in FIG. 6A. In one example, an exception event is characterized as a single number, a group of numbers, multiple mathematical functions, or statistical distributions with tunable parameters. These quantitative measures are dynamically refreshed as the factory production progresses, and define this exception event parameter 214. In one example, this exception event parameter 214 is implemented by a relational database table that documents the all the exception events occurring in the factory.

In one aspect, this surveillance information tracked via surveillance module 230 stored in a management information system (MIS) 226 database generally associated with the production facility 14, and which may or may not be part of the production facility 14. This surveillance information tracked via surveillance module 230 also is provided, via feedback loop 221, to operations assessment function 224 of production scheduler 222.

In one example, the surveillance parameters 232-238 from production surveillance module 230 is fed into, and is cooperable with, parameters 211-216 of task-resource scheduler 200 (FIG. 6A). In other examples, the surveillance parameters 232-238 from production surveillance module 230 is used separately from parameters 211-216 of task-resource scheduler 200 (FIG. 6A).

In one example, generation of the task-resource schedule 190 (FIG. 7A) by task-resource scheduler 180 (as described above in association with FIG. 5) is performed according to an evolutionary-based computation, meta-heuristic optimization scheme, as further described below in association with at least FIGS. 8A-8C.

By employing the evolutionary-based optimization scheme along with the surveillance information and the prioritized order of print requests from the dispatcher module 100, the task-resource scheduler 180 of the present disclosure provides significant performance benefits over traditional task sequencing approaches that rely on generally rigid rule-based heuristics, and which, therefore do not account for the wealth of production-related information applied by task-resource scheduler 180.

FIG. 8A is a flow diagram schematically illustrating one example of an evolutionary-based optimization scheme in association with one example of a print production system in the present disclosure. In one embodiment, Figure 8A schematically illustrates a method 300 of optimizing a solution for first and second sort functions 104, 106 of dispatcher module 100 (FIGS. 2A and 3-4) and/or for task-resource scheduler module 180 (FIG. 5). In one example, the optimization scheme represents application of an evolutionary-based computation, meta-heuristic optimization scheme to either sort print requests into an ordered list of print requests or sort tasks into a task sequence or assigning tasks to a suitable resource. In general terms, in an evolutionary-based, meta-heuristic optimization scheme, candidate solutions to the optimization query play the role of individuals in a population, and a fitness function evaluates the quality of a candidate solution, for instance, the quantifiable business objective it can achieve if this candidate solution is implemented. This scheme uses a fitness function to differentiate candidate solutions. The candidate solutions that perform poorly have less chance to be selected to produce offspring. Evolution of the population then takes place after the repeated application of the genetic operators and with the fitness or strength of a particular solution evaluated via the fitness function. Details of how the evolutionary-based meta-heuristic optimization scheme is applied in the context of examples of the present disclosure are further described below.

As shown in FIG. 8A, optimization method 300 includes an initial population 302 of solutions, a solution evaluator module 304 with fitness function 306, an optimizer query function 310 with stop criteria 315, an end solution function 312, a genetic operators module 320, and a new generation function 340. The initial population 302 of solutions includes an array of chromosomes.

In one example associated with dispatcher module 100, as schematically represented in Table 370 of FIG. 8B, each gene 374 corresponds to a print request (to be sorted) while chromosome 372 corresponds to a prioritized list of print requests (being sorted) as represented by a sequence of the genes 374. In one example associated with task-resource scheduler module 180, and as schematically depicted in Table 380 of FIG. 8C, each chromosome 382 has two parts 384 and 386. The first part 384 is an ordered list of genes that encode the priorities of the tasks (under study) while the second part 386 is an ordered list of genes that encode the assignment of a resource to a task. In one example, the sequence of print requests or the sequence of tasks or the resource assignment of tasks in a chromosome is represented by a sequence of integers. In another example, each gene is a floating point number encoding the priorities of a print request or a task or assigned resource to a task.

With further reference to FIG. 8A, using an initial population 302 of solutions (in which each solution is represented by one chromosome), the solution evaluator module 304 evaluates each possible solution according to a fitness function 306 to determine which solution is the most effective.

Optimization query function 310 queries whether an optimized solution has been found via applying stop criteria 315. In one example, the stop criteria 315 includes terminating the optimization cycles when: (1) the fitness value exceeds a predefined threshold value; (2) an increase in the fitness value between two consecutive generations is less than another threshold value; or (2) the optimization solution is demanded by an external event, such as a TAKT trigger event calling for release of an ordered list of print requests or a task-resource schedule.

In the event that the optimization query is answered affirmatively (e.g. Yes), then the current end solution 312 is adopted. In one example, for the first sort function 104 of the dispatcher module 100 shown in FIG. 3, the end solution 312 would indicate the relative priorities of all print requests within one due date container. In one example, for the second sort function 106 of the dispatcher module 100 in FIG. 4, the end solution 312 would correspond to a prioritized listing of all print requests for all due date containers. In one example, for task-resource scheduler 180 (FIG. 5), the end solution 312 would correspond to a sequence of tasks and resources assigned to fulfill these tasks to implement the top N print requests within a time interval. In one example, N corresponds to TAKT quantity as previously noted and as further described below in association with at least FIGS. 9A-9B.

As further shown in FIG. 8A, the optimization scheme in method 300 also comprises the genetic operators module 320, which includes a reproduction function 322, a selection function 324, a mutation function 326, and a crossover function 328. In one aspect, via genetic operators module 320, the system causes an iteration of reproduction (via reproduction function 322) using chromosomes as parents while applying one of the respective selection function 324, mutation function 326, and crossover function 328. It will be understood that other variations of genetic operators can be applied as well to enhance the evolutionary-based optimization that drives toward an optimized solution for the dispatcher module 60, 100 and/or the task-resource scheduler 68, 180.

Upon applying the genetic operators 322-328 of module 320, a new generation 340 of chromosomes (e.g. proposed solutions) is produced, and which is evaluated according to fitness function 306. Those chromosomes (e.g. proposed solutions) that have a fitness value below a predetermined threshold fitness value may have a higher probability to be discarded.

Iterations of the evolutionary cycle via the optimization scheme in method 300 are continued until the stop criteria 315 indicate that an optimized solution has been reached, as previously described above. The optimized solution for a particular function (e.g. first sort function 104 of dispatcher 100, second sort function 106 of dispatcher 100, task-resource scheduler 180) is then available for application in production scheduler 12.

In one example, in addition to considering other factors or parameters, the fitness function 306 includes or accounts for the parameters 211-216 of operations assessment function 210 of task-resource scheduler 200 in FIG. 6A. As previously noted, some of these parameters 211-216 include and/or cooperate with production surveillance data obtainable via production surveillance module 230, as previously described in association with at least FIG. 6B.

In one example, using production surveillance information, a normalized risk-aware slack (regarding both process failures and machine failures) is calculated for an order O (a print request) as follows, $$S(O) = 1 - \frac{E(O)}{d(O) - t_c} \quad (1)$$

In equation (1), S(O) represents the normalized risk-aware slack for order O, d(O) is the due time for order O, Tc is the current release time. Meanwhile, E(O) represents an estimated fulfillment time for an order, which is described further below. For all the print requests in the order pool to be optimized, in one example, the fitness function 306 is defined to minimize the maximum of the variance of S(O) for all the print requests in the order pool.

Among other information, the data obtained from the factory production surveillance system includes the exception events (e.g. exception events parameter 238) that document the process failure resulting in rework (e.g. process rework parameter 212). A probabilistic failure rate is calculated for each resource and the estimated fulfillment time for a print request or order is calculated according to the task-resource schedule (e.g. FIG. 7B) generated according to its production plan. For a sequential process involving N resources, the estimated fulfillment time is $$E(O) = \sum_{i=1}^{N} \frac{w_i(O) + s_i(O) \cdot v_i}{\prod_{j=1}^{N} (1 - p_j)} \quad (2)$$

In equation (2), Pj is the faulty rate of the resource j, Si is the workload the order O projected on the resource i, Vi is the process speed of the resource i, and WI is the wait time of order O (e.g. print request) at the resource i.

The parameter Wi has two components. The first component of parameter Wi is the wait time incurred due to current factory workload (e.g. workload parameter 211 in FIG. 6A); this is calculated according to the work-in-progress record (recording tasks already assigned to a resource waiting in queue to be processed), such as work-in-progress parameter 236 in FIG. 6B, for each resource in the Resource Database. The second component of parameter Wi is the wait time incurred due to the print requests yet to be released to the factory floor, but while being in a current evolutionary optimization cycle, already have been assigned to this resource and are to be fulfilled before the order O.

The events that interrupt the resource such as machine failure and consumable replenishment (e.g., out-of-ink) are also recorded in the Resource Database, based on which a (probabilistic) service availability rate is calculated for each resource. This service availability rate is applied to calculate the two components of Wi.

In one example of employing the fitness function, the differential treatment parameter 216 (FIG. 6A) is employed via assigning a weight to each S(O) to signify the differential treatment to each order, which is based on an identity of the print buyer and/or other factors. In one aspect, a smaller weight gives this order a larger buffer for on-time delivery, and therefore it has higher probability compared to other print requests to be delivered on time.

It will be understood that examples of the evolutionary-based optimization schemes associated with examples of the production scheduler in the present disclosure are not strictly limited to the fitness function described above in association with Equations 1 and 2.

In one example, the evolutionary-based computation, meta-heuristic optimization scheme described in association with FIGS. 8A-8C is expressed via programming instructions, such as the programming instructions listed below as Listing One, as part of an optimization engine that models and optimizes digital printing production.

synchronize and meter the operations of the components (e.g. dispatcher module 460, task-resource scheduler module 480, and resource database 470) of production scheduler 400 and the production facility 14. In particular, at fixed intervals (e.g., TAKT time), the TAKT clock 410 sends a trigger event to prompt the various components to perform an action. At least some of the trigger events sent by TAKT clock 410 are further illustrated in association with FIG. 9B.

Listing One

```
1: for each task v_i in the system do              1: for each task set T do
2:     Compute ω(v_i), an estimate of worst-case    2:     for each task v_i ∈ T do
       execution delay                              3:         estimate σ(v_i), slack Time of v_i,
3:     Initialize δ(v_i), deadline of v_i           4:         Assign a Resource
4: end for                                          5:     end for
5: Generate Initial Population P(t) of chromosomes  6:     Sort T based on σ(v_i) to determine p(v_i), ∀v_i ∈ T
6: while termination criterion not reached do       7:     Compute effective priority p(v_i), ∀v_i ∈ T
7:     for each chromosome of P(t) do               8:     Sort T based on p(v_i)
8:         Create Schedule using procedure in       9:     Schedule all tasks in T
           Figure 4.                               10: end for
9:         Determine fitness value, f
10:    end for
11:    Reproduction P(t) → P(t + 1);
12:    Crossover P(t) → P(t + 1);
13:    Mutation P(t) → P(t + 1);
14:    P(t) ← P(t + 1)
15: end while
```

Figure 9A:
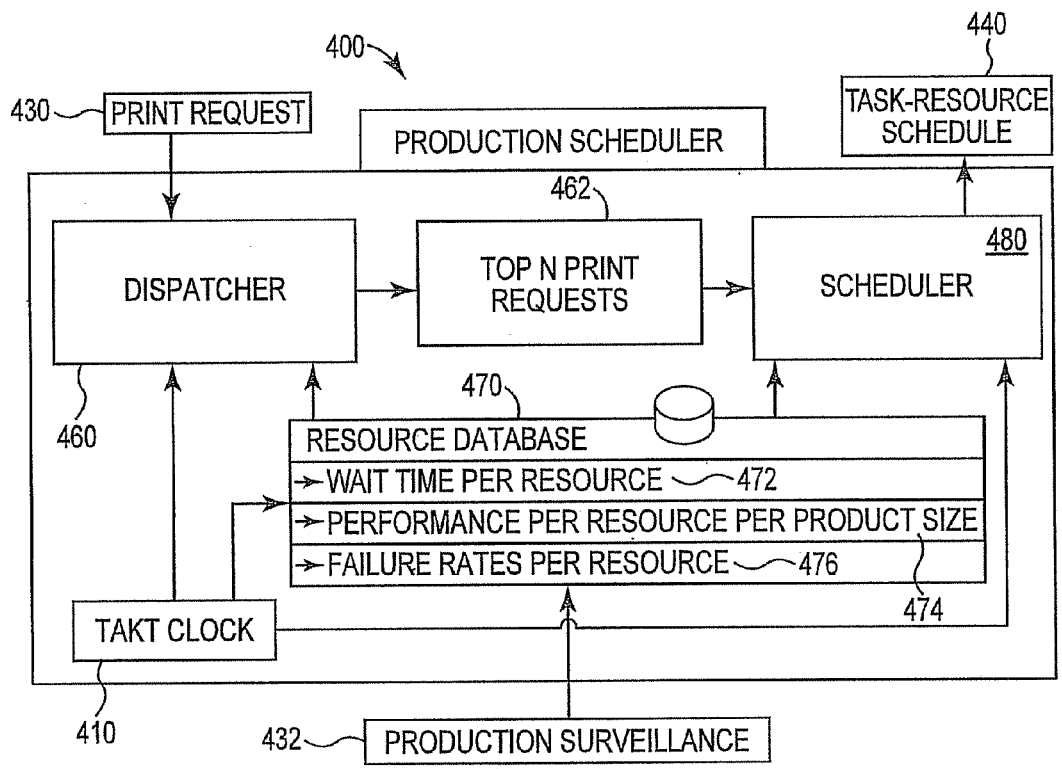
FIG. 9A is a block diagram schematically illustrating one example of a production scheduler in the present disclosure.

FIG. 9A is a block diagram of one example of a production scheduler 400 of a print production system in the present disclosure. In one embodiment, production scheduler 400 includes at least substantially the same features and attributes as production schedulers 12 and 222, as previously shown and described in association with at least FIGS. 2A-2B and 6B, respectively. As shown in FIG. 9A, production scheduler 400 includes a dispatcher module 460, resource database 470, task-resource scheduler module 480, and TAKT clock 410. The dispatcher module 460 and task-resource scheduler module 480 operate in generally the same manner as the other dispatcher modules and task-resource scheduler modules previously described throughout this present disclosure by receiving incoming print requests 430 (e.g. orders) and then producing a production schedule 440 that is released to a production facility. As in previous examples within this present disclosure, the dispatcher module 460 releases an ordered list of the top N print requests to the task-resource scheduler module 480. The resource database 470 of production scheduler 400 receives and stores product surveillance information from a production facility 14 via product surveillance module 432, in a manner generally the same as previously described in association with feedback loop 221 and product surveillance module 230 of FIG. 6B. The resource database 470 also supplies pertinent information regarding resources of the production facility 14 to dispatcher module 460 and to task-resource scheduler module 480. The resource-related information includes, but is not limited to, resource wait time parameter 472 (e.g. wait time per resource), resource performance parameter 474 (e.g. performance per resource per product size), and resource failure parameter 476 (e.g. failure rates per resource), In some examples, this resource-related information complements, incorporates, or is incorporated within the parameters 232-238 of production surveillance module 230 (previously described and illustrated in FIG. 6B) and parameters 211-216 of operations assessment function 210, as previously described and illustrated in association with FIG. 6A.

Figure 9B:
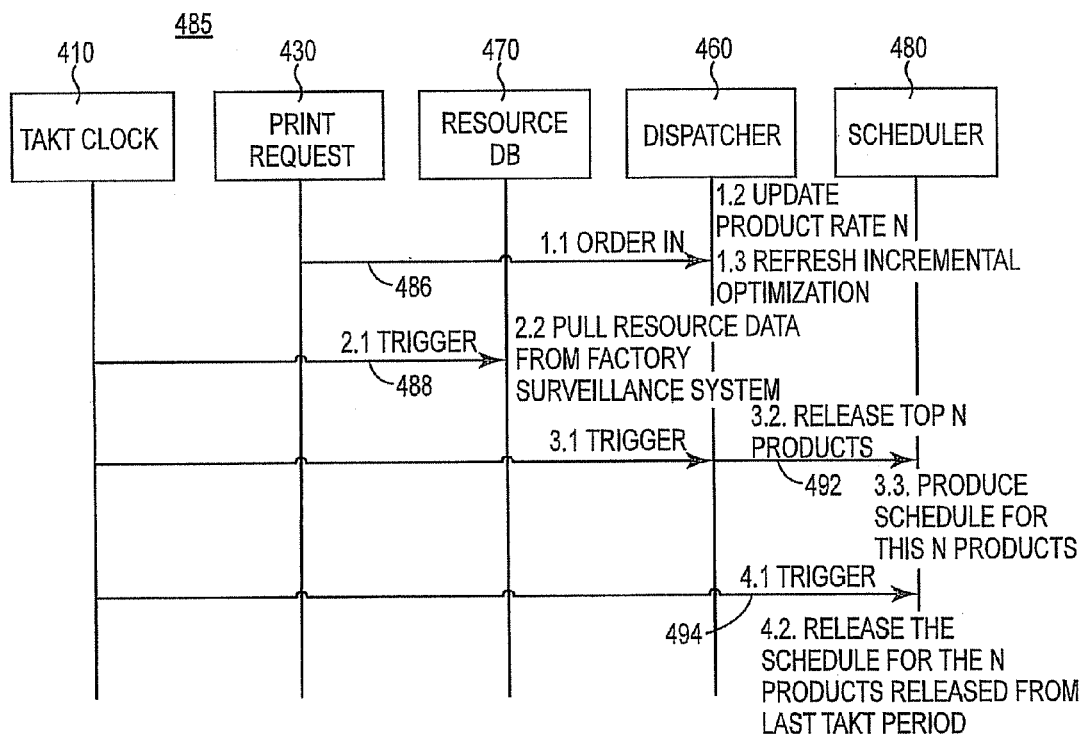
FIG. 9B is a diagram schematically illustrating one example of an activity plan related to one example of a production scheduler in the present disclosure.

In one example, production scheduler 400 includes a TAKT clock 410 that provides a periodic trigger signal to FIG. 9B is an activity diagram 485 of one example of the operation of TAKT clock 410 triggering action of components and modules, such as resource database 470, dispatcher module 460, and task-resource scheduler 480. As shown in FIG. 9B, an admitted print request 430 is received in dispatcher 460, which prompts dispatcher 460 to update the "print request" arrival rate N and to refresh the incremental optimization. The TAKT quantity can be the same as N, or derived based on using computation methods that account for the historical and forecasted changes of N, as previously noted.

In one example, TAKT events are produced at a fixed time interval referred to as TAKT time, which provides one form of a periodic trigger signal. In one aspect, the quantity N identified in FIGS. 9A-9B is referred to as TAKT quantity and generally determines the factory production rate. The TAKT quantity calculated based on at least the "print request" arrival rate to ensure that the production facilities are meeting the demand rate while accounting for other factors to obtain smooth production flow. Accordingly, the TAKT time and TAKT quantity contribute to a factory management control scheme that bridges the stochastic demand and the desire for smooth production flow.

Based upon the regular operation of TAKT clock 410, a trigger event (488) is issued at one of the fixed clock intervals that prompts resource database 470 to pull resource data from the production surveillance information from the production facility (e.g. via production surveillance module 230 in FIG. 6B) and this information is provided to dispatcher 460 and task-resource scheduler 480 as shown in FIG. 9A. A subsequent trigger event (492) causes dispatcher 460 to release the top N print requests to task-resource scheduler 480, which produces a task-resource schedule for the top N print requests. A subsequent trigger event (494) causes task-resource scheduler 480 to release the task-resource schedule (for the top N print requests released at trigger 492) to the production facility (e.g. production facility 14 in FIG. 1). With further reference to dispatcher module 460 in FIGS. 9A-9B, it is noted that examples of a dispatcher module were previously described as continually optimizing solutions within due date containers and across due date containers, except for the dispatcher module responding to at least two types of events: (1) an incoming new print request; and (2) a trigger event sent by TAKT clock 410. These interactions will be further described below.

To handle an incoming new order or print request, in one example the dispatcher module 460 performs the following actions. First, the dispatcher module 460 updates a product demand rate N to reflect the new print request. In addition, based on the due date specified in the new print request, the dispatcher module 460 identifies one of the series of due date containers to act as a host due date container. The dispatcher module 460 then inserts the new print request into an intermediate optimization solution (regarding the priority of print requests within the host due date container) at the end of this prioritized list of the print requests within the due date container to form a new prioritized list of the print request in that host due date container. With this adjustment, the dispatcher module 460 continues performing the optimization on the updated due date container, as well as optimizing solutions for all the other undisturbed due date containers that are being optimized in parallel to the adjusted due date container.

To respond to a trigger event issued by TAKT clock 410, in one example the dispatcher module 460 performs the following actions. First, the dispatcher module 460 creates a new prioritized listing of print requests by copying the top N print requests from the most recently optimized prioritized list of all print requests. The dispatcher module 460 sends this new prioritized list of top N print requests to the task-resource scheduler module 480, which in turn produces a task-resource schedule as previously described.

Using a due date of each print request, the dispatcher module 460 identifies the due date container from which each print request (in the new prioritized listing of print requests) originated and then the dispatcher module 460 deletes that print request from its originating due date container. After the due date containers have been cleared of the targeted print requests, the dispatcher module 460 resumes priority sorting within due date containers (in a first stage) and across due date containers (in a second stage), as previously described.

Figure 10:
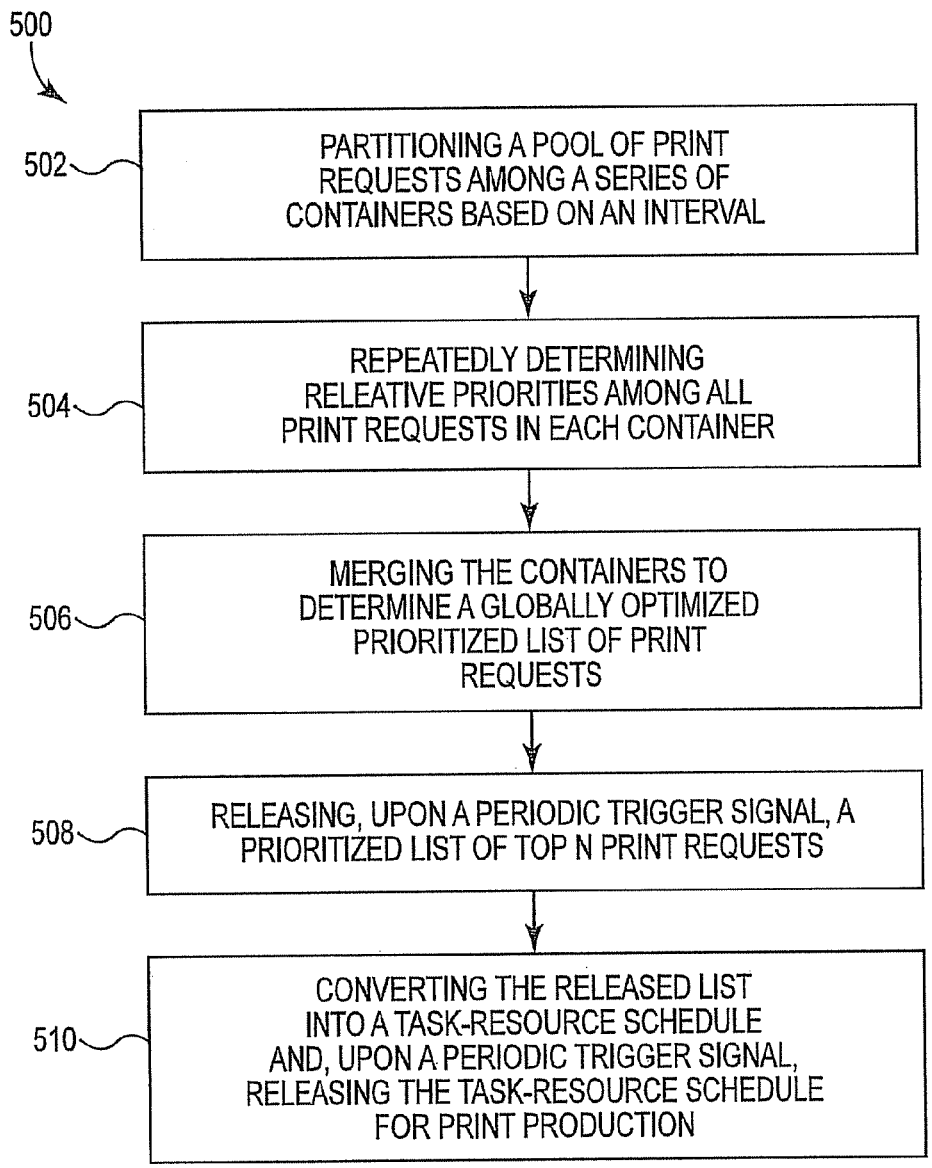
FIG. 10 is a flow diagram schematically illustrating one example of a method of production scheduling in the present disclosure.

FIG. 10 is a flow diagram of one example of a method of scheduling print production in the present disclosure. In one embodiment, method 500 is performed using the functions, modules, components, and/or systems as previously described in association with FIGS. 1-9B. In another embodiment, method 500 is performed using functions, modules, components, and/or systems other than those described in association with FIGS. 1-9B.

In one example, as shown at 502 in FIG. 10, method 500 includes partitioning a pool of print requests among a series of containers based on an interval. Relative priorities among all print requests within each container are repeatedly determined, as shown at 504. The containers are merged to determine a globally optimized prioritized list of print requests, as shown at 506, and a prioritized list of the top N print requests is released upon a periodic trigger signal, as shown at 508. The released prioritized list (of the top N print requests) is converted into a task-resource schedule and released (upon a periodic trigger signal) for print production, as shown at 510.

Figure 11:
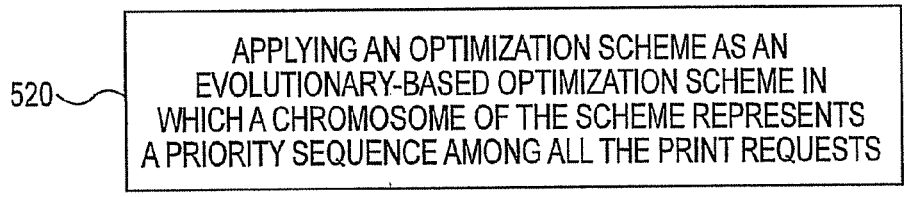
FIG. 11 is a portion of a flow diagram schematically illustrating one example of a portion of a method of print production scheduling in the present disclosure.

In one example, optimization schemes are used to perform the determination actions (at 504), the merging actions (at 506), and the conversion actions (at 508) and in a further example, as shown at 520 in FIG. 11, method 500 includes applying a population-based optimization scheme as an evolutionary-based meta-heuristic optimization scheme in which a chromosome of the scheme represents a priority sequence among the print requests.

At least some examples of the present disclosure provide techniques for more effective and efficient print production scheduling via use of parallelized computing, optimization, and/or real-time feedback information from a production facility. These examples in the present disclosure provide high speed production scheduling that efficiently maximizes a throughput of the production facility while meeting all the specialized demands common into today's printing industry.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this present disclosure be limited only by the claims and the equivalents thereof.

The invention claimed is:

1. A print production scheduler comprising:
a server including a non-volatile memory to store, and a processor to execute, machine readable instructions to provide:
a dispatcher module including:
a first sort function to sort a plurality of print requests for placement, among containers, wherein each container is assigned a time interval, and each of the plurality of print requests is placed in one of the containers according to a time-based attribute of the print request and the time interval of the container where the print request is placed, and
within each container, the first sort function is to sort priorities of the print requests within the container; and
a second sort function to sort the print requests across all the containers into a prioritized list of all print requests,
wherein the dispatcher module selects top N print requests from the prioritized list and releases them upon a first periodic trigger signal; and
a task-resource scheduler module to convert the prioritized list into, and to release upon a second periodic trigger signal, a task-resource schedule.

2. The print production scheduler of claim 1, wherein at least one of the first sort function, the second sort function, and the task-resource scheduler perform operations according to an evolutionary-based computation, meta-heuristic optimization scheme.

3. The print production scheduler of claim 2, wherein the dispatcher module classifies the print requests within each container according to a distribution pattern including at least one of a first portion, a second portion, and a third portion with the respective portions arranged with the first portion corresponding to relatively higher priorities, the third portion corresponding to relatively lower priorities, and the second portion corresponding to relative priorities intermediate to the higher and lower relative priorities.

4. The print production scheduler of claim 3, wherein the second sort function produces the prioritized list of print requests for all containers via:
performing, in parallel for all adjacent pairs of containers, a merge function to merge together each adjacent pair of containers, wherein the third portion of one container is merged with the first portion of an adjacent container.

5. The print production scheduler of claim 1, wherein the intervals are defined to cause the containers to generally contain the same number of print requests and wherein the intervals are defined to at least one of a due date attribute, an elapsed slack time attribute, an estimated lead time attribute, a non-time based attribute, and a single criterion based on a combination of multiple attributes.

6. The print production scheduler of claim 1, wherein the dispatcher module includes:
an incoming print request function to receive a new print request to assign the new print request to one of the containers, to insert the new print request into an intermediate sorting solution for the assigned container, and to resume operation of the first sort function to the container to identify the relative priorities among all print requests for the container associated with the new print request.

7. The print production scheduler of claim 1, wherein the task-resource scheduler comprises an operations assessment function to determine the task-resource schedule based, in part, on real-time surveillance information from a production factory, wherein the surveillance information includes at least one of:
a per resource workload parameter;
a process rework parameter; and
a resource interruption parameter.

8. A print service provider system comprising:
a production scheduler module including a server having a non-volatile memory to store, and a processor to execute, machine readable instructions to provide:
a dispatcher module including:
a first sort function to sort a plurality of print requests for placement among containers, wherein each container is assigned a time interval, and each of the plurality of print requests is placed in one of the containers according to a time-based attribute of the print request and the time interval of the container where the print request is placed, and,
within each container, the first sort function is to sort priorities of the print requests within the container; and
a second sort function to merge the containers to produce a prioritized list of print requests for all containers;
a release function to release, upon a first periodic trigger signal, a portion of the prioritized list that includes a top N print requests; and
a task-resource scheduler module to convert the released list into, a task-resource schedule and upon a second periodic trigger signal, releasing the task-resource schedule; and
a print production facility including at least one printer to at least partially perform the task-resource schedule, wherein the print production facility includes a surveillance module to track real-time surveillance information at the print production facility including at least one of a resource workload parameter, a process rework parameter, and a resource interruption parameter,
wherein the task-resource scheduler module converts the released list into the task-resource schedule based at least partially on the real-time surveillance information.

9. The print service provider system of claim 8, wherein first sort function, the second sort function, and the task-resource scheduler perform at least some operations, according to an evolutionary-based, meta-heuristic optimization scheme in which a chromosome represents at least one of:
a prioritized sequence of print requests for the first and second sort function; and
a prioritized task-resource schedule for the conversion of the released list.

10. The print service provider system of claim 9, wherein at least one of the first sort function, the second sort function, and the task-resource scheduler temporarily terminate application of the optimization scheme according to a stop criteria including at least one of:
receipt of a periodic trigger event signal;
an increase of a fitness value between two consecutive generations in the optimization scheme is less than a threshold value; and
a fitness value exceeds another threshold value.

11. The print service provider system of claim 8, wherein the machine readable instructions provide:
a TAKT clock to issue trigger events to meter operation of the production scheduler module relative to the production facility, including synchronizing operation of the respective first and second sort functions of dispatcher module and the task-resource scheduler.

12. A non transitory computer readable medium storing machine readable instructions, executable on a processor, for performing an automated method of managing print production, the method comprising:
partitioning a pool of print requests among containers, wherein each container is assigned a time interval, and the partitioning includes placing each of the plurality of print requests in one of the containers according to a time-based attribute of the print request and the time interval of the container where the print request is placed;
within each container, determining priorities among print requests in the container; and
merging the containers to determine a global prioritized list of print requests for the containers;
releasing, upon a first periodic trigger signal, a portion of the prioritized list that includes a top N print requests; and
converting the released list into a task-resource schedule and releasing, upon a second periodic trigger signal, the task-resource schedule for print production.

13. The computer readable medium of claim 12, comprising:
upon admission of a new print request, performing an incremental optimization according to a most recent optimization solution of at least one of:
the relative priorities within a respective one of the containers;
the merging of containers; and
the task-resource schedule,
wherein the incremental optimization and the most recent optimization solution are performed according to a population-based computation optimization scheme.

14. The computer readable medium of claim 12, comprising:
classifying the print requests within each container, according to a distribution within the container of the relative priorities, into at least one of a first portion, a second portion, and a third portion;
arranging the first portion to include relatively higher priorities within the respective container, the third portion to include relatively lower priorities within the respective container, and the second portion to include relative priorities intermediate to the relative priorities of the first and third portions; and
performing, in parallel for all adjacent pairs of containers, a merge function to merge together each adjacent pair of containers to produce the global prioritized list, wherein the third portion of one container is merged with the first portion of an adjacent container.

15. The computer readable medium of claim 12, wherein the method comprises:
- receiving, upon a periodic trigger signal, real-time surveillance information from a production facility, the surveillance information including at least one of a factory workload parameter on a per resource basis, a process rework parameter, and a resource interruption parameter; and
- performing at least one of the repeated determinations of the relative priorities, the merging of containers, and the converting of the released list according to the surveillance information.

* * * * *